United States Patent [19]

Rimer

[11] Patent Number: 5,432,841
[45] Date of Patent: Jul. 11, 1995

[54] SYSTEM FOR LOCATING AND COMMUNICATING WITH MOBILE VEHICLES

[76] Inventor: Neil A. Rimer, 9, Avenue Jacques Martin, 1224, Geneva, Switzerland

[21] Appl. No.: 911,971

[22] Filed: Jul. 10, 1992

[51] Int. Cl.⁶ .......................... H04Q 7/22; G01S 3/02
[52] U.S. Cl. .......................................... 379/59; 379/58; 342/457; 455/33.1
[58] Field of Search .................... 379/59, 60; 455/33.1, 455/33.2; 340/988, 989, 990; 342/357, 450, 451, 454, 457

[56] References Cited

U.S. PATENT DOCUMENTS

| | | | |
|---|---|---|---|
| 4,229,620 | 10/1980 | Schaible | 179/2 EB |
| 4,644,351 | 2/1987 | Zabarsky et al. | 455/33.1 |
| 4,654,879 | 3/1987 | Goldman et al. | 455/33.2 |
| 4,688,244 | 8/1987 | Hannon et al. | 379/58 |
| 4,831,539 | 5/1989 | Hagenbuch | 340/988 |
| 4,891,650 | 1/1990 | Sheffer | 342/457 |
| 4,901,340 | 2/1990 | Parker et al. | 379/60 |
| 5,043,736 | 8/1990 | Darnell et al. | 342/357 |
| 5,054,110 | 10/1991 | Comroe et al. | 379/59 |
| 5,210,787 | 5/1993 | Hayes et al. | 379/60 |
| 5,218,367 | 6/1993 | Sheffer et al. | 342/457 |

FOREIGN PATENT DOCUMENTS

| | | |
|---|---|---|
| 0290725 | 11/1988 | European Pat. Off. |
| 0501058 | 9/1992 | European Pat. Off. |
| 91/05429 | 4/1991 | WIPO |

OTHER PUBLICATIONS

Wareby, Jan, "Intelligent Signaling: FAR & SS7", Cellular Business, pp. 58, 60 and 62, Jul. 1990.

Kaczmarek, K. W., "Cellular Networking: A Carrier's Perspective", 39th IEEE Vehicular Technology Conference, May 1, 1989, vol. 1, pp. 1-6.

Primary Examiner—Curtis Kuntz
Assistant Examiner—Michael B. Chernoff
Attorney, Agent, or Firm—Wolf, Greenfield & Sacks

[57] ABSTRACT

A vehicle location system which provides a plurality of cellular systems that each includes a memory for identifying the cellular subscriber stations that are based in the particular system and visiting cellular subscriber stations based in another of the systems. The plurality of cellular systems include a roaming network that interconnects and transfers data in the memory relative to the presence of home and visiting cellular subscriber stations in the systems. An interface computer is provided to interconnect with at least one of the plurality of cellular systems. The interface computer accesses data in the roaming network relative to predetermined cellular subscriber stations. A location computer interconnects with the interface computer and translates the interface computer data relative to these predetermined cellular subscriber stations into location data that indicates the position of each cellular subscriber stations based upon the known position of the particular cellular system in which the subscriber station is currently registered. A user interface, that may include messaging systems and an electronic mail system, interconnect between a user and the location computer and allows access to location and related data relative to specified fleets of subscriber stations.

20 Claims, 16 Drawing Sheets

SYSTEM FOR LOCATING AND COMMUNICATING WITH MOBILE VEHICLES

FIELD OF THE INVENTION

This invention relates to the field of mobile vehicle location determination and corresponding messaging systems and, more particularly, to a system that allows relatively low-cost fleet management of vehicles over a wide geographical area.

BACKGROUND OF THE INVENTION

Demand for mobile vehicle positioning and messaging is growing very rapidly. A typical application for such a mobile vehicle positioning and messaging system is in the field of truck fleet management whereby a central dispatch office of a trucking company may obtain the location of each truck in a widely dispersed geographical area upon demand. Using such a system, the dispatch office can track the location and progress of each vehicle, thus updating the vehicle's arrival time for customers. Some systems currently available also allow the transmission of messages between the truck and dispatch office while enroute; this facilitates diversion of the truck to additional pick-up sites, for example.

One class of available system that allows the sending and receiving of messages is provided by Qualcomm. The system, named Omnitracs TM, uses satellites to determine vehicle position via triangulation. A dish antenna which tracks the satellites is mounted within each vehicle in a pod placed, generally, upon the vehicle roof. The dish must continuously track the location of the satellite as the vehicle moves. Messages to and from the vehicle are limited to pager style alphanumeric readouts. Voice and facsimile messages are also unavailable due to the limited bandwidth of satellite transmission. However, the most significant disadvantage to the Qualcomm system is cost. The vehicle-borne base unit and the satellites are rather expensive to maintain. Additionally, the dish mechanism may be prone to breakage since it is an electromechanical link that must maintain fairly precise alignment while subjected to extreme vibration and jarring in the normal highway environment.

Another class of available vehicle location systems are systems such as Motorola's CoveragePLUS TM system based upon the Specialized Mobile Radio (SMR) system. In these systems vehicles carry conventional 2-way SMR units for mobile radio communication. These units communicate with one of a number of dedicated and proprietary fixed earth stations that have been installed or converted expressly for vehicle location use. The system determines which earth station is within range of the mobile unit, thereby obtaining the approximate vehicle location. The location determination is based largely upon signal strength. A major disadvantage of the CoveragePLUS TM system is the large investment necessary to deploy the required dedicated earth stations. Since accuracy of the CoveragePLUS TM system is inversely related to the range of each earth station, a large number of stations is required to provide adequate coverage. In order to cover the continental United States, therefore, CoveragePLUS TM requires over 1,200 dedicated earth stations. Even using existing radio towers, the cost of equipment would be quite substantial and on the order of tens of millions of dollars. Higher accuracy may be obtained by equipping the vehicle with an outside positioning system such as LORAN C, and transmitting the LORAN C longitude and latitude data over the radio link. This higher accuracy comes at the cost of equipping each vehicle with a LORAN C receiver, which at the time of this application involves about $700 per vehicle.

Another class of vehicle location system utilizing a somewhat unconventional antenna medium is the meteor-burst system. Vehicles are equipped with a LORAN C device or equivalent triangulation system that establishes each vehicle's position using government-operated transmitters. The position data from these LORAN C units is then transmitted from the vehicle to the base station via reflections off of the ionized "tails" of micro-meteorites entering the earth's atmosphere. Signals in the range of 37 Mhz to 70 Mhz are reflected by these tails. Thus, short packets of radio signals may be transmitted from the vehicle to the base station during meteor bursts. These bursts may also carry rather short data/text messages to and from the vehicle. A great disadvantage to this system is that a number of base stations (100 or more) must be dedicated to receiving transmissions from meteor bursts. Since meteor bursts are intermittent and unpredictable in time and location, in order to insure the receipt of a signal from one of the bursts, a very large number of costly base stations would be required. Continuous signals carrying the same data would be repeated until the correctly positioned "burst" appeared, allowing transmission to one of the base stations. Clearly, this system also requires somewhat costly vehicle-borne transceivers for utilizing the meteor bursts.

Yet another class of system that has been proposed would utilize a cellular telephone network to determine the approximate position of a vehicle. Such a system is proposed in U.S. Pat. No. 4,891,650 to Sheffer for locating stolen vehicles. The system fixes upon the position of a stolen vehicle by triangulating the signal strength of the vehicle's cellular transmissions between three or more base station transmitters, or "cells" in a given cellular system. To do so, the vehicle must first register a signal to its transmitter that is activated via a signal indicating that the vehicle carrying it is being stolen. The transmitter then places a dialed call over the cellular network to a base unit which then searches through the system to determine which cells the vehicle is currently near. This information may be utilized to locate the vehicle. Clearly, one disadvantage to the Sheffer system is that it requires placing a call over the cellular network, which actively engages the voice channels on the cellular network. While this form of direct transmission is perfectly acceptable in the somewhat infrequent occurrence of a vehicle theft, it would prove rather costly, and wasteful of cellular voice channels, when utilized to track an entire fleet of vehicles. Basically, it would require a continuous placement of expensive long distance cellular phone calls to continuously update vehicle location.

Additionally, the coverage of the Sheffer system is limited to only one cellular system having been modified to implement it. This would necessarily limit such a system's operation to an area such as a single city. To provide wider coverage, all switches (groupings of cells) of a particular system must be modified. This would prove very costly and require approval of all the cellular operators serving the area of interest. All the cells in each of the switches to be tapped must be similarly modified, and the interconnections between these switches must also be modified in order to provide the requisite wide coverage. Even if one were to provide a LORAN C or similar positioning unit and merely make a phone call to report the data, the cost of cellular telephone-based vehicle location would remain high since the calls themselves are expensive and continuously occupy a large number of scarce voice channels.

A vehicle location system that, unlike the above-described systems, is based entirely upon existing and established system hardware is highly desirable since implementation costs would be minimized. As such, the growing cellular telephone network currently being implemented throughout the nation, and the world, provides a likely candidate for a vehicle location system. As noted above with reference to the Sheffer system, however, a system that requires placement of costly telephone calls is wasteful and expensive to operate.

A basic cellular telephone system 32 is depicted in FIG. 1. The concept of a cellular system involves utilization of a number of base stations 36a-f each having a transceiver that covers a particular transmission area known as a "cell" 38a-f. There are usually a number of cells, and an equal number of corresponding "base stations" within a particular cellular system. Often, such a system covers a given metropolitan area or highway stretch between metropolitan areas. In this example each cell 38a-f has coverage boundaries 35 that are schematically depicted as defining a hexagon. In reality, boundaries will tend to be circular and overlap each other, and may vary in dimensions based upon such factors as terrain and obstructions. Base stations are generally positioned so that a given system area is fully served in transmission and reception. The outer boundaries 41 of the system 32 are generally defined by the outermost cells therein. The base stations 32a-f are all interlinked to a particular "switch" or mobile switching center (MSC) 37. There may be more than one MSC within any given cellular system. The system 32 of FIG. 3 depicts one MSC 37 for simplicity. The MSCs are connected to the public switched telephone network (PSTN) 39 which is more commonly known as the local telephone company. The telephone company interlinks the various subscribers each having a hard wired conventional telephone set, shown schematically as the single handset 43.

Each vehicle 34a-d in communication with a particular base station includes its own on-board transceiver more commonly termed a cellular telephone or cellular subscriber station (CSS). The transceiver allows communication with a particular base station. Base stations throughout a cellular system, and throughout the country, utilize a standard communication protocol, thus, CSSs moving from one "cell" to another are equipped to continue to communicate with other cells in the system.

Communication of CSSs traveling between cells in a system is coordinated by means of a communication protocol carried out between the CSSs and the switching center (MSC) via the base station covering the area in which the CSS is currently located. Thus, as a vehicle 34a moves from cell 38a to cell 38c (as shown in FIG. 1A), while engaged in a call, CSS communication from base station 36a is transferred, in an uninterrupted manner to base station 36c. The link between the vehicle CSS and a given cell is maintained because the MSC 37 is constantly updated as to the particular position of the vehicle. The MSC 37 tracks the CSS even if it is not engaged in a call because each CSS transmits, at a predetermined time, a so-called "self-registration" signal over a control radio channel. This signal comprises data representing a unique identification number (Mobile Serial Number (MSN)) identifying the particular CSS. It is transmitted on both a time-dependent periodic basis and each time the CSS sends or receives a call. The Mobile Serial Number matches a number registered in the MSC for that CSS. Note that the MSC is programmed with the CSS's Mobile Serial Number, because the CSS user is a subscriber to that particular cellular system and, thus, the user's CSS is registered with the system. Thus, when a particular cell receives the self-registration signal from a CSS, the MSC is alerted that the recognized CSS is now within that particular cell.

Until recently, the automatic updating of vehicle location occurred only on a system-wide basis (e.g., only between cells in a single system). It was generally not possible to move to an adjacent cellular system and maintain uninterrupted cellular service (particularly reception) since the new system did not recognize the presence of the "foreign" CSS's transmitted MSN number automatically. However, large groups of systems in various geographical areas are now implementing a so-called "roaming" network whereby suitably equipped cellular systems are alerted to the presence of foreign (unregistered) CSSs within their system. Each switch in the roaming network is connected to the others, usually by land lines carrying telephone calls and/or data. Data is passed between the systems relative to CSSs currently present in their coverage areas on certain of these lines. The network is a system for controlling the direction of the data. As such, uninterrupted communication (roaming) is possible for CSSs traveling between systems.

It is important to note that each cellular system is identified by a unique 15 bit System Identification Number (SID) that is assigned by the FCC. Each CSS is registered only with a single cellular system, termed the "home" system as described above to which its user subscribes. In general, a CSS's home system is a cellular system that covers the area in which the CSS's user lives or travels most of the time. The SID number of the home system is stored in the CSS's internal memory (usually set by the system operator when the user's subscription begins) and is transmitted as part of the self-registration process.

This basic vehicle and host/home system identification information is carried on the roaming network in order to keep track of the various CSSs traveling within the network.

It is, therefore, an object of the present invention to provide a system for locating vehicles utilizing existing cellular telephone hardware and software for implementing a roaming standard in an unintended manner that allows location of vehicles over a widely dispersed geographical area without the need of complex, specialized and costly vehicle-borne hardware and without the need to modify the cellular network equipment.

SUMMARY OF THE INVENTION

The objects of this invention are achieved by tapping roaming network information through which one can derive the location of particular vehicles without actually placing costly telephone calls. Thus, an inexpensive system for tracking vehicles over a wide geographical area is possible. Additionally, there is no need to alter existing base station or switch hardware or software to tap the data, thus lowering location system implementation costs. In fact, access to only one switch that is part of a given roaming network allows access of all CSS data relative to all switches in the network since all the roaming data is shared by all the switches in the network. Using the tapped data it is possible to develop a data base of vehicle locations. To locate any vehicle it need only carry a basic cellular telephone transceiver.

In addition, using a cellular system, one is not limited to obtaining location data only. Rather, since the cellular system is designed to carry large volume voice information, one may also transmit various data and facsimile information to vehicles having cellular transceivers. Thus, location and messaging services are possible via the cellular roaming network.

A vehicle location system according to a preferred embodiment of the present invention provides an interface computer that is connected to a roaming network that joins a number of individual cellular systems. Each of the cellular systems stores data relative to and identifies cellular subscriber stations that are based within that particular system and also identifies visiting cellular subscriber stations from other cellular systems that are currently within the given system. The roaming network transfers identification data between each of these cellular systems so that each cellular subscriber station's home system may keep track of the cellular subscriber station and transfer calls to and from the station while the station is situated in another cellular system.

The interface computer accesses roaming network data via a given cellular system and scans that data for predetermined cellular subscriber station identification numbers that correspond to particular stations of interest to a user. These stations, which may comprise a fleet of vehicles, generally carry the tapped cellular system as their registered "home" system. That user may be a fleet operator or other mobile vehicle management entity.

In order to interpret the tapped interface data relative to predetermined subscriber stations, a location computer taps, on demand of a user or at predetermined intervals of time, into the interface computer data. The location computer then interprets, cellular system identification data corresponding to each predetermined vehicle. Location data is particularly derived by comparing system identifications to known geographical locations for those particular systems. This data is then correlated to each vehicle and formatted so that a user may easily review the location of various subscriber stations. Such review may include electronic display maps, charts, graphs and textual formats.

This system may be adapted to tap multiple roaming networks, where more than one network is in place, by determining the probable location of moving vehicles from one roaming network to another. This may entail predicting vehicle location using previous vehicle position, speed and approximate direction. Such data would be stored within the memory of the location computer for each vehicle and would be transferred to an appropriate interface computer interconnected with each roaming network through a given cellular system attached thereto.

BRIEF DESCRIPTION OF THE DRAWINGS

The foregoing and other objects and advantages of the invention will become clearer by referring to the following detailed description and the drawing, in which.

DETAILED DESCRIPTION

Figure 1:
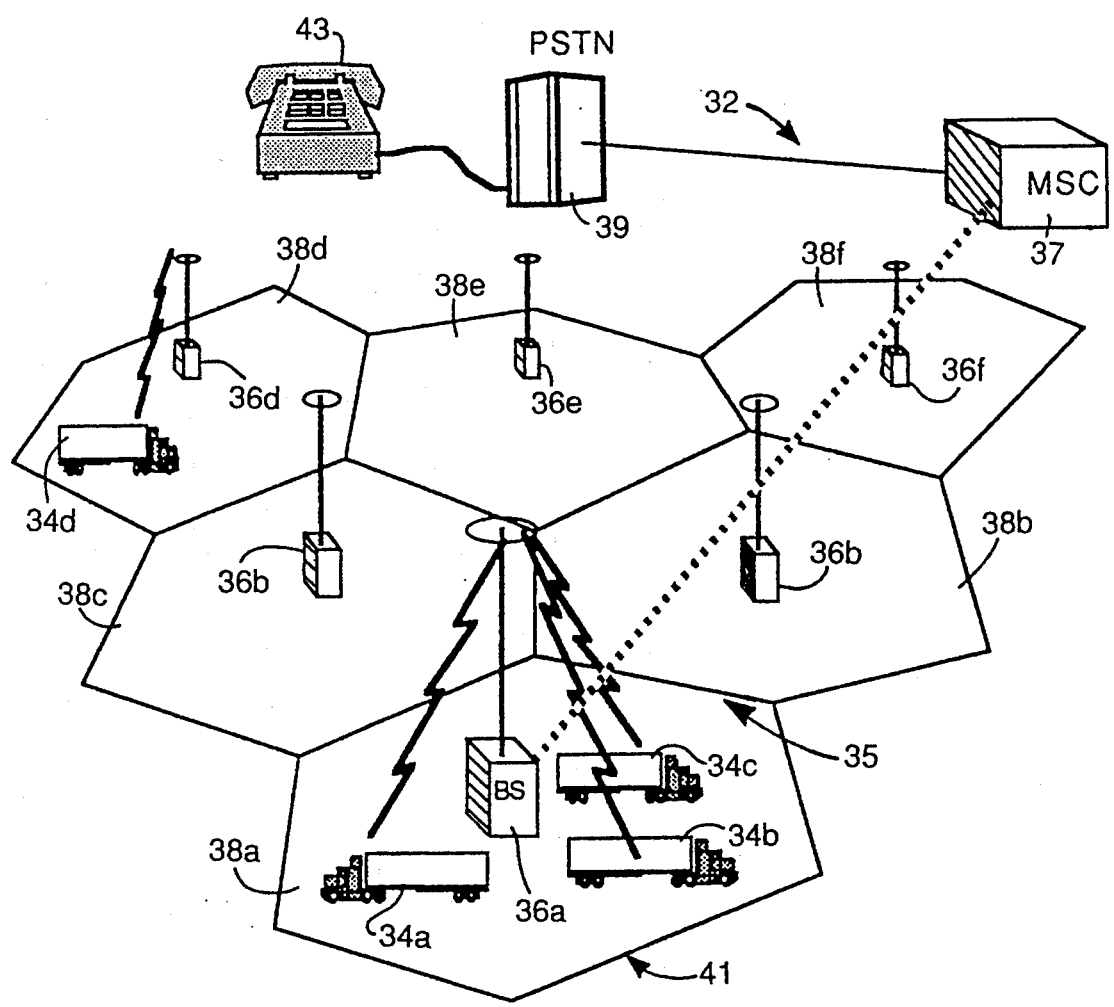
FIGS. 1 and 1A are schematic diagrams of a simplified cellular system as utilized by the vehicle location system according to this invention with vehicles moving between different system cells at first and second times.
Figure 1A:
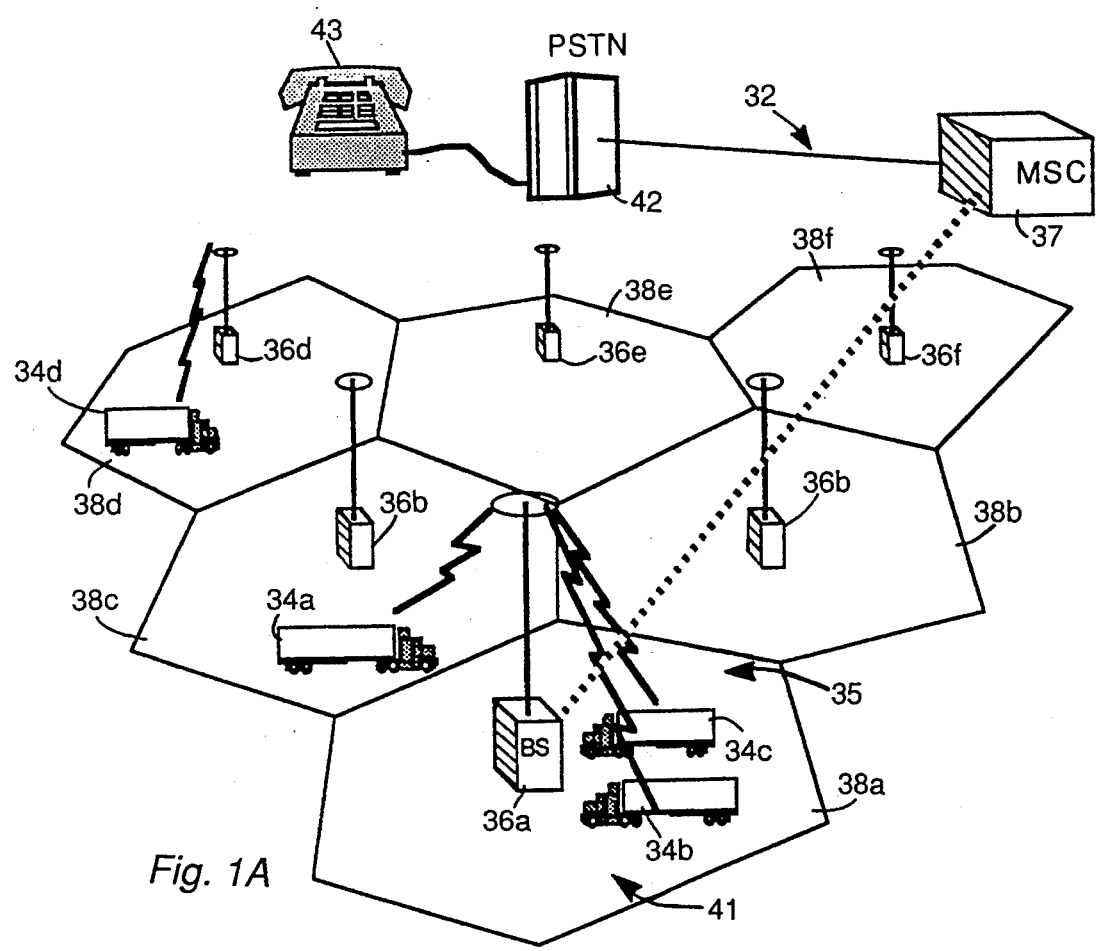
Figure 2:
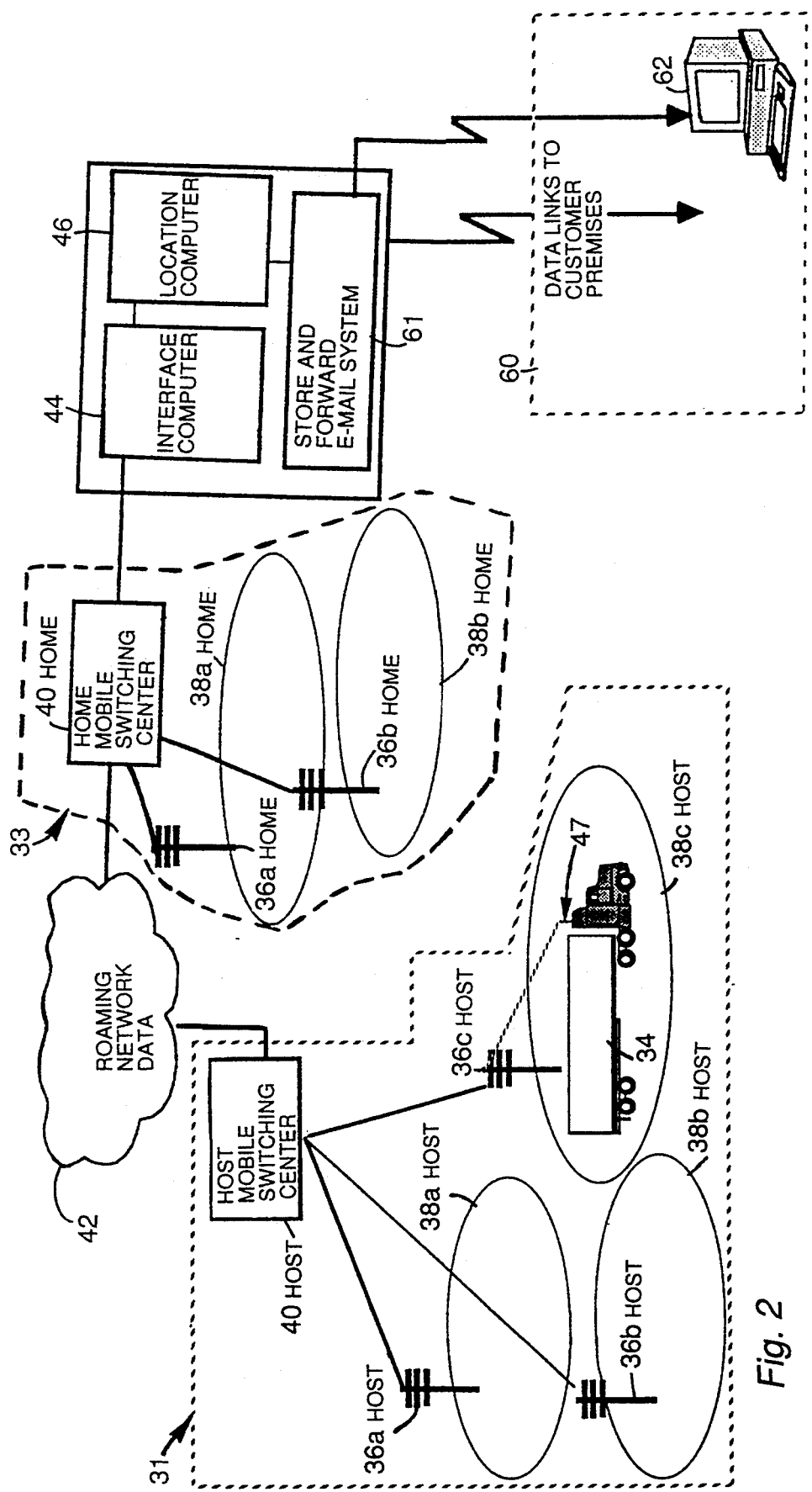
FIG. 2 is a schematic diagram of an overview of the vehicle location system according to this invention.

An overview of the cellular vehicular location system according to this invention is depicted in FIG. 2. A vehicle 34 (similar to the multiple vehicles 34a-d of FIG. 1) having an on-board cellular subscriber station (CSS) 47 is served by base station $36c_{HOST}$ of cell $38c_{HOST}$ of one of a plurality of cellular systems. The systems depicted include the vehicle's "home" system 33 and a remote "host" system 31. Each system includes one corresponding switch, $40_{HOME}$ and $40_{HOST}$ respectively, interconnecting various base stations $36a$-$b_{HOME}$ and $36a$-$c_{HOST}$ in cells $38a$-$b_{HOME}$ and $38a$-$c_{HOST}$. It is assumed that the cellular systems described herein implement a protocol defined in ELECTRONIC INDUSTRIES ASSOCIATION/TELECOMMUNICATIONS INDUSTRIES ASSOCIATION (EIA/TIA) Standard for Mobile Station-Land Station Compatibility, Specification EIA/TIA-553 (September 1989 publication) which is incorporated by reference herein. As previously discussed, according to this standard, each vehicle which carries a CSS is assigned a unique 32 bit Mobile Serial Number (MSN) that is permanently stored in its security memory (not shown). The vehicle 34 in this figure is traveling in a system 31 other than its own registered "home" cellular system 33. The remote "host" system 31 within which the vehicle 24 is traveling may recognize the vehicle by means of its 32 bit MSN which is transmitted at regular time intervals by the vehicle Cellular Subscriber Station (CSS) 47. By "registering" or, in the case of automatic signalling "self-registering" with the host system 31, the vehicle 34 CSS makes its presence known to the host.

It is assumed, for the purposes of this description, that the vehicle's host system 31 and home system 33 are joined together by a network 42 adhering to the standards set forth in EIA/TIA-553 and also to the so called "roaming" standard currently being instituted under ELECTRONIC INDUSTRIES ASSOCIATION/TELECOMMUNICATIONS INDUSTRIES ASSOCIATION (EIA/TIA) IS.41 Interim Standard for Cellular Radio Telecommunications Intersystem Operations, Specification (January, 1991). This standard should be deemed to be incorporated herein by reference. As previously discussed, this roaming standard allows a vehicle to be located and to communicate with another cellular system via a link referred to as the "roaming network". Thus, as a vehicle 34 moves from the area serviced by one cellular system to the area serviced by another, the roaming network 42 informs the vehicle's home system 33 of this new location, allowing the home system to route calls to the CSS vehicle 34, wherever it may be in the network 42, as a result of which callers can reach the CSS 35 of the vehicle 34, and vice versa.

As discussed above, minimum communication linkage via a roaming network is maintained, particularly by means of the self-registration process carried out by the CSS. According to this process an identification signal (MSN) is sent by the vehicle, and received by the host MSC, at a predetermined time interval or when the CSS user makes and receives calls. The self-registration process, thus, acts as a tracking "beacon" that is received by the closest base station in the system in which the CSS is currently present. The roaming network allows the base station and, hence, the system to identify the CSS. Therefore, means for tracking a vehicle as it travels has been developed by us, using this network. Data received by the home system 33 from the host system 31 through the roaming network 42 is utilized by depicted interface and location computers 44 and 46, respectively, according to this invention, to determine the current location of each vehicle carrying a CSS. The vehicle location is thus known to within the geographic area of a single cell and/or the geographic area served by the MSC serving that cell. The particular mechanics involved in interfacing with the roaming network will be described further below.

Figure 3:
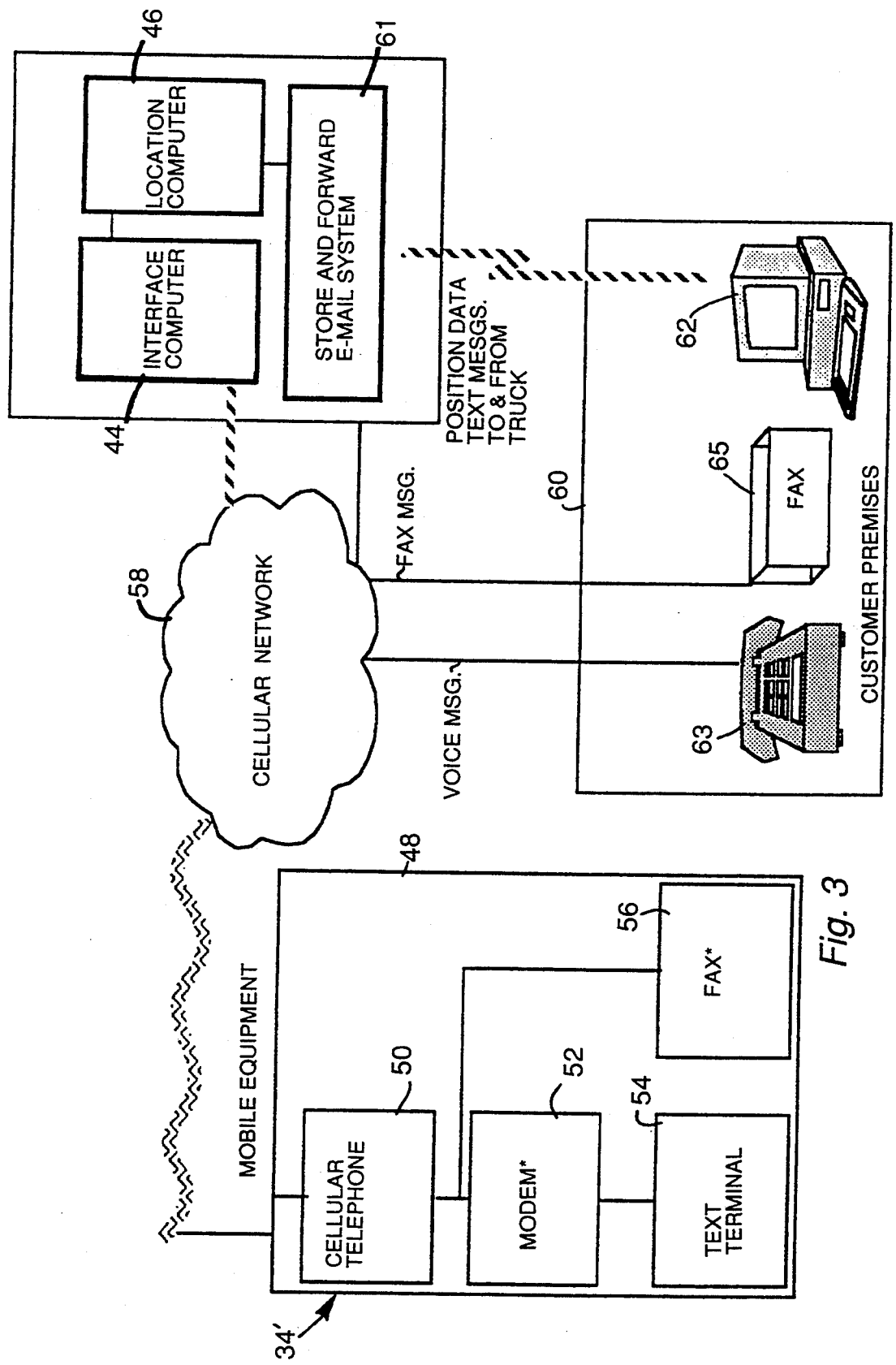
FIG. 3 is more detailed schematic diagram of the peripheral transmission and data display elements of the vehicle location system of FIG. 1.

Vehicle and user peripherals for use with the vehicle location system are illustrated in FIG. 3. The system implementation includes the mobile equipment 48 of a vehicle CSS's 34' which includes a standard cellular telephone 50 and may include peripherals such as a modem 52 to interconnect a text terminal and/or onboard computer and a facsimile machine 56. The mobile equipment is joined by a standard cellular radio link, which transmits both voice line and self-registration signals, to the cellular network which includes the various cellular systems joined by the roaming network which allows conventional calls or facsimile messages to be transferred to and from the vehicle from the vehicle's home base 60. According to this invention, information from the cellular network 58 (systems joined by a roaming capability) is utilized by the interface computer 44 and location computer 46, to determine and transmit the vehicle's location data to a home base terminal or computer system 62 adapted to receive external communications via an electronic mail system 61 to which the interface and location computers 44, 46 are linked. This customer may have its own voice unit (e.g., telephone) 63 and facsimile unit 65 as well. Note that, according to this invention, it is equally possible to transmit and display location information to the customer premises through a variety of other links, such as direct transmission without an electronic mail link.

FIGS. 2 and 3, thus, generally depict the vehicle location system according to this invention and should be referred to generally throughout the following detailed description.

As noted, a CSS operating outside the area served by its home system may be referred to as "roaming". While roaming, a CSS is thus being served by a non-home "host" system. Absent agreed protocols, the host has no way of recognizing the identity of the CSS and no data exchange necessary for communication as be carried out by the host. Thus, an agreed, standardized (and preprogrammed) protocol, via the roaming network, is necessary in order to allow each cellular system to recognize other systems' roaming registered CSSs.

To provide "seamless" roaming capability to users (i.e., without interruption in service when traveling from one cellular system to another) while traveling over geographical areas served by several cellular systems, roaming under EIA/TIA IS.41 standard is being implemented. This standard specifies how individual cellular systems are interconnected to form a "roaming network". All relevant portions of EIA/TIA IS.41 are hereby incorporated herein by reference.

Detailed Operation of The Roaming Network and System Implementation

Figure 4:
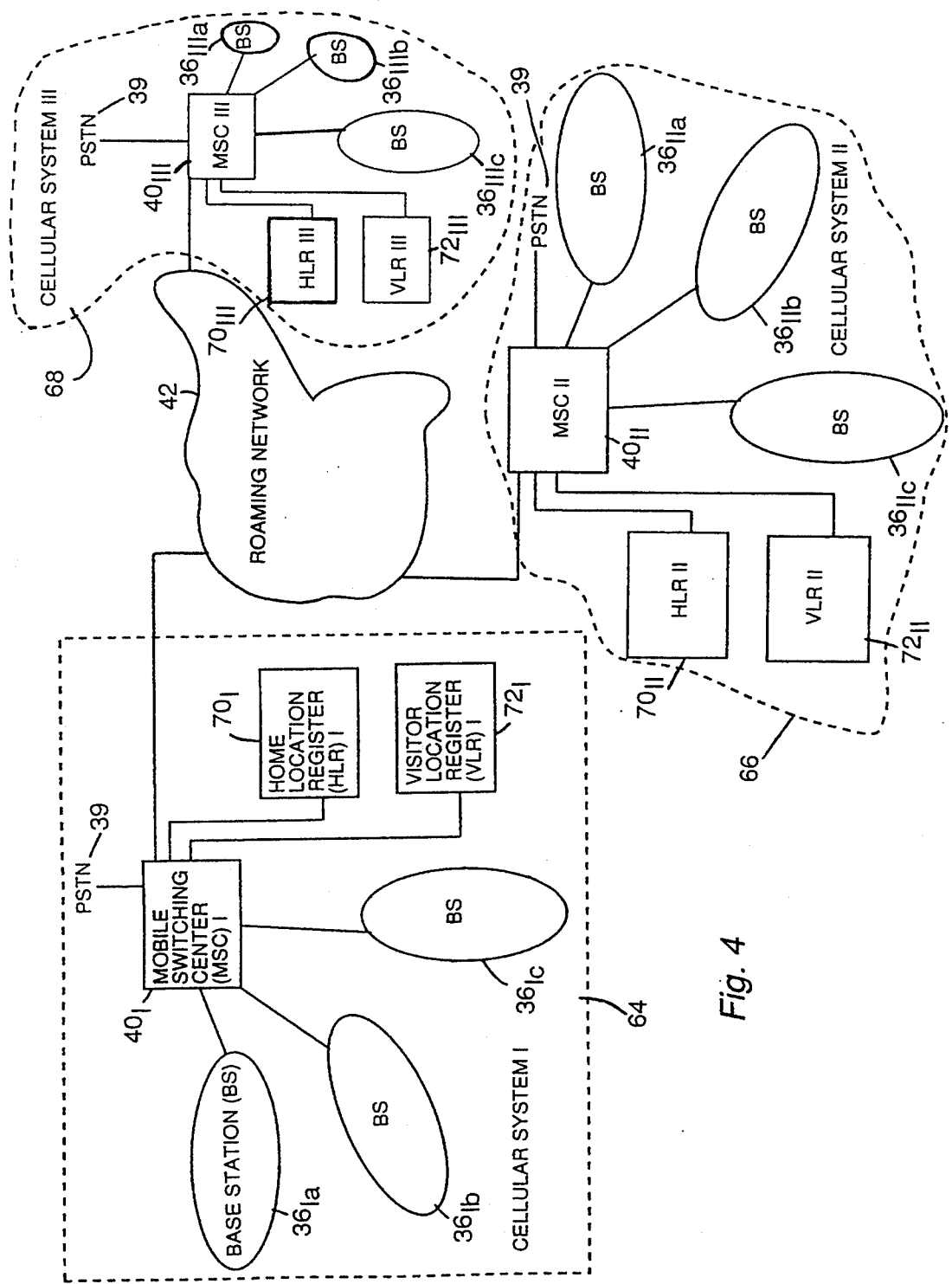
FIG. 4 is a schematic diagram of a roaming network for joining a plurality of cellular systems utilized in the vehicle location system according to this invention.

The "mechanics" of the roaming network are further detailed in FIG. 4. Each of cellular systems I, II and III, 64, 66 and 68 respectively, maintains a group of data bases (registers) that include the Home Location Register (HLR) $70_I$, $70_{II}$ and $70_{III}$ and the Visitor Location Register (VLR) $72_I$, $72_{II}$, and $72_{III}$ that are part of each switch (MSC) in the system. The HLR $70_{I-III}$ store specified information relating to each CSS registered with that specific cellular system. In other words, each HLR $70_{I-III}$ stores information relating to those CSSs whose home is specified as being that HLR's particular cellular system. Records of all registered CSSs are maintained even when CSSs roam outside the region served by their home cellular system. Conversely, the VLRs $72_{I-III}$ store specified information relating only to CSSs currently roaming within the area served by the particular cellular system in which the VLR is located. HLRs and VLRs are usually located within Mobile Switching Centers (MSCs) $40_{I-III}$ but may be implemented in separate units.

According to the EIA/TIA IS.41 standard, when an MSC determines, from information received over the roaming network 42, that a roaming Cellular Subscriber Station (CSS) has entered its service area, it initiates a Registration Notification Procedure. Part of the procedure calls for transmitting a Registration Notification message to the HLR of the CSS's home system over the roaming network 42. The transfer is performed by network landlines that interconnect all systems therein. The data passed to the home HLR $70_{HOME}$ by the host MSC, as detailed by the HLR registers 74, 76 and 78 in FIG. 5, includes:
1) the unique Mobile Serial Number (register 74) (MSN) of the CSS;
2) the Mobile Switching Center Identification 76 (MSC ID or SID) number (register 76) of the host system now serving the CSS;
3) the Switch ID (register 78)(SWID), which is defined as the Identification (ID) number of the switch (SW) and MSC within the host system serving the CSS.

The SID (System Identification Number) and SWID (Switch ID) of the host switch serving the roaming CSS are stored in the home HLR so that telephone calls bound for the CSS from the Public Switched Telephone Network (PSTN) 39 or the cellular network 58 may be forwarded to the called CSS's current host system. These procedures insure that the home system HLR is always updated with the SID and SWID of the switch (MSC) serving the CSS while it is roaming. If the CSS is not roaming, but rather, is still within its home system, the HLR simply contains the Identification Number (SWID) of the home system switch serving the CSS. In order to initiate a registration notification, first an autonomous registration signal (self-registration) by the CSS must be transmitted to the base station. As noted previously, this can also be triggered by a call origination, a call termination (i.e., a page response) or a service order. While call origination, call termination or service orders may require action by the user (using scarce voice channel capacity), a calling party or a system operator, autonomous self-registration occurs automatically at regular time intervals as described above and does not use voice channels. The frequency of this autonomous registration is a function of a number of parameters set forth by the system operator and defined in EIA/TIAV553. In general, the parameters are set so that CSSs self-register each 30 minutes or less.

Figure 5:
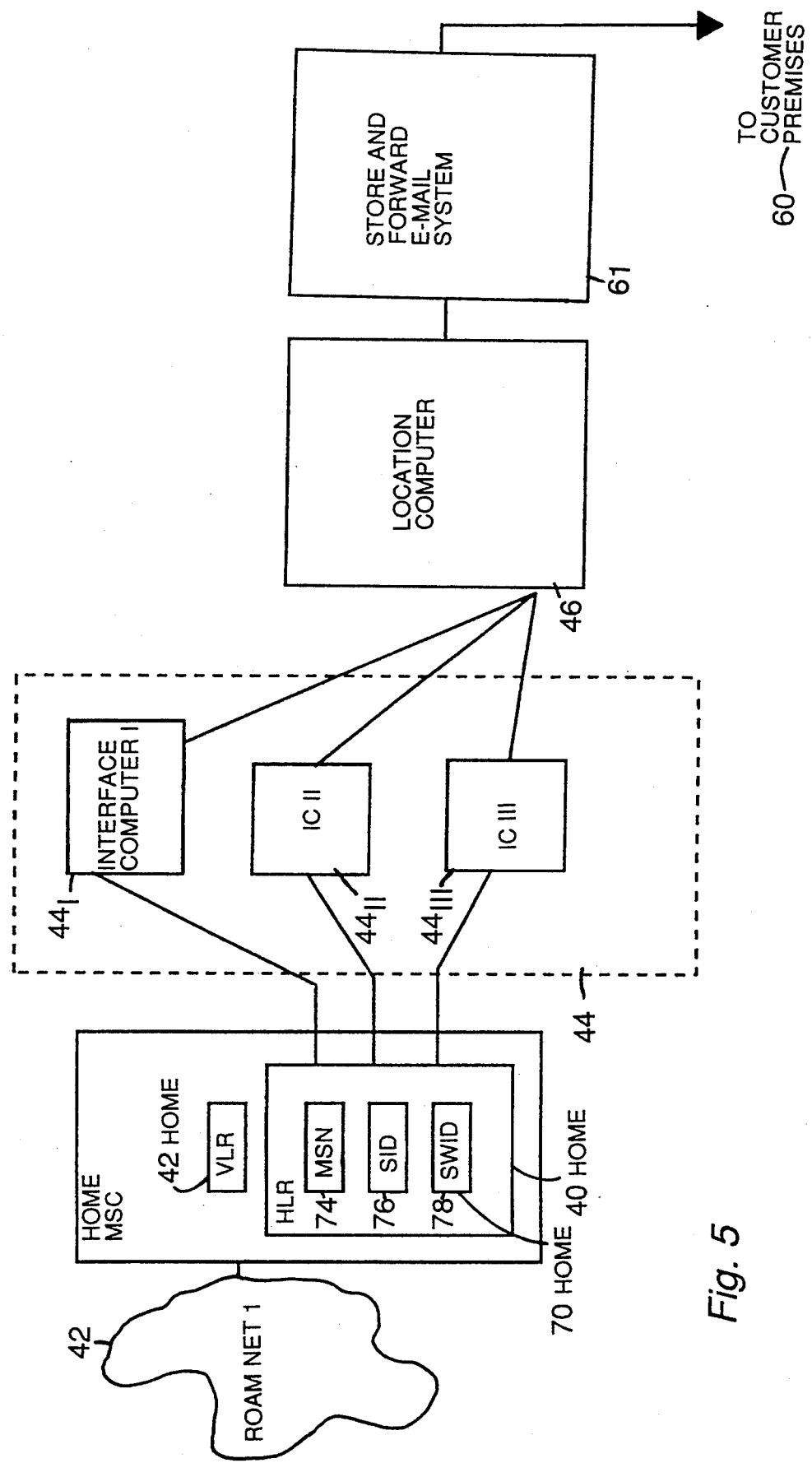
FIG. 5 is a schematic diagram of a basic location system implementation according to this invention.

The implementation of a basic system for locating vehicles through the roaming network 42 is depicted in FIG. 5. This system is interfaced with a particular MSC $40_{HOME}$ interconnected with the roaming network 42. At least one interface computer is interconnected with the switch $40_{HOME}$ and receives information on CSS registration from the switch. In this example, three interface computers IC I ($44_I$), IC II ($44_{II}$) and IC III ($44_{III}$), are assigned to the MSC $40_{HOME}$ in order to lighten the processing load. The switch selected for connection to the interface computer(s) according to this invention may be considered the home switch in the home system for the purposes of CSS registration. In other words, each CSS to be located will carry a registration number (MSN) that identifies that CSS as belonging to the depicted home MSC $40_{HOME}$. Each switch is connected with CSSs that are registered to it. These CSSs are in their respective "home" switch/system. Each switch may also at any time be connected with a number of CSSs that are registered to a different switch or system. These CSSs, therefore have a different "home" switch than that in which they are currently present. The non-home switch is, therefore considered to be a "host" switch and system. The roaming network 42 allows the MSC $40_{HOME}$ to record periodically the location (i.e., the particular host cellular system) of each home-registered CSS even if it is visiting in another host system. The home registered CSS registration data (stored in HLR registers MSN 74, SID 76 and SWID 78), termed HLR data, is read from the home MSC $40_{HOME}$ by one of the interface computers $44_I$, $44_{II}$ and $44_{III}$. These computers store the information in an internal data base for subsequent transmission to a central location computer 46 of this embodiment. This computer concentrates and coordinates all data received from the various interface computers $44_{I-II}$ connected to the switch (MSC) $40_{HOME}$. The location computer 46, according to this invention, then processes the HLR data from the interface computers $40_{I-II}$ and determines the cellular system location of each CSS registered to this home MSC $40_{I-III}$. This information is then forwarded to the electronic mailbox system 61 that, in turn, transfers the location information to the customer site 60. The customer, which is generally connected by modem to the electronic mail system, maintains a terminal or computer 62 for receiving the data in a readable format (e.g., terminal 62 of FIGS. 2 and 3). As will be described further below, the interface and location computers 44 and 46 are adapted to provide to a particular customer only data relative to that customer's vehicle fleets. As such, the customer only receives data indicating the location of its own vehicles; thus, not only is privacy maintained, but also the customer is relieved of the burden of culling wanted data from unwanted data.

With specific reference to the interface computers $IC_I$, $IC_{II}$ and $IC_{III}$ as depicted in FIG. 5, several different methods of allowing the computers $44_{I-III}$ to access HLR data may be employed. The home MSC $40_{HOME}$ respectively, can be programmed to transmit to a port, or alternatively, store in a file, data relating to changes occurring in HLR entries from the tracked CSSs. Changes in HLR entries for home-registered vehicles are brought about by the registration signals received from the roaming network 42. The roaming network 42, itself receives the signals from the various host systems in which CSSs are located. The interface computers can then read and decipher this information. Alternatively, the interface computer(s) $44_{I-III}$ can be disposed directly between the IS.41-based roaming network 42 and the home MSC $40_{HOME}$. The interface computers 60, 62, 64 allow the information to pass through to the MSC 56 unaffected, but would capture the messages carrying the new data bound for the home MSC's HLR $70_{HOME}$.

Yet another method of reading data involves reliance upon a feature that is proposed for the next revision of the IS.41 standard (IS.41-B), that allows switches to read each other's HLR registered data. The interface computer or computers could then be adapted to read HLR data by simulating a switch-to-switch call for accessing each switch's HLR register. In the depicted embodiment, the HLR information is obtained by the interface computers $44_{I-III}$ by accessing the MSC's operations and maintenance port (not shown). The interface computers $44_{I-III}$ then query the HLR database $70_{HOME}$, 74, 76 and 78 using the man-machine command interface built into the MSC $40_{HOME}$ operating software. The implementation of this method, of course, varies from switch to switch.

With particular reference to Northern Telecom switches (DMS/MTX switch family), the interface computer logs into the Operations Administration and Maintenance System over a local serial connection or a Dial-in I/O port. The interface computer then issues commands over the system's generic database access language (the BCS software system) to retrieve the necessary HLR information. Alternatively, on a Motorola switch (the EMX family), the interface computer logs into the Service Order Port normally used by CAMP terminals. The interface computer then uses the CAMP man-machine command interface to read the HLR fields of data from the subscriber database.

Interface Computer Procedure

Figure 6:
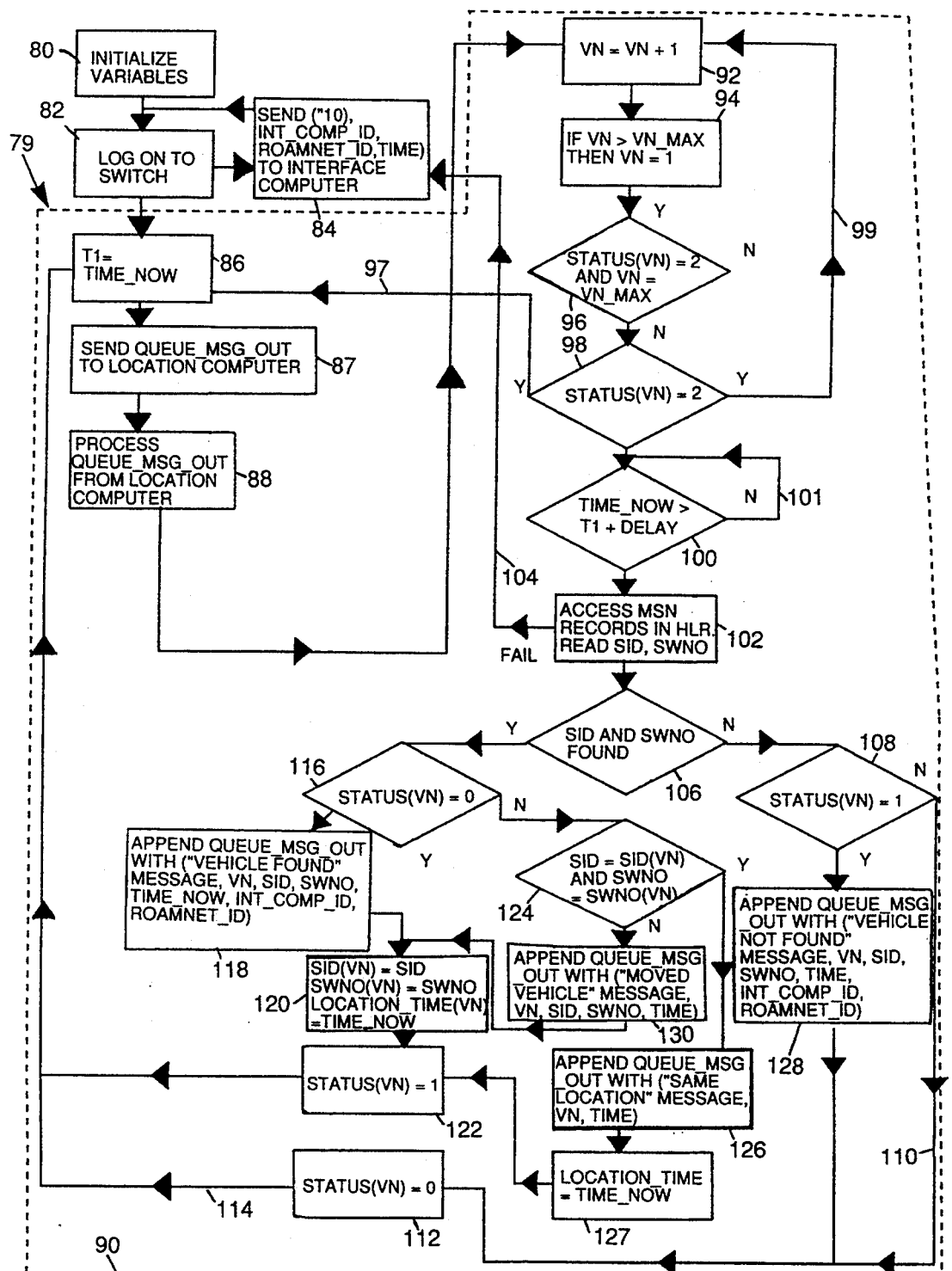
FIG. 6 is a flow diagram of an interface procedure for use by the interface computer of FIG. 5.

FIG. 6 illustrates a procedure executed by the interface computer(s) ($44_{I-III}$ throughout this description) according to one embodiment of this invention. It should be noted that the interface computer(s) continually receives messages sent from the location computer 46 and queues them in a register termed QUEUE_MSG_IN. The messages are loaded from the location computer through a standard file transfer protocol such as Kermit.

The procedure depicted in FIG. 6 allows communication between each interface computer(s) $44_{I-III}$ and the location computer 46, and between the interface computer and the tapped system MSC $40_{HOME}$ (FIG. 5), alternatively. The registers utilized in the procedure are defined briefly in Table 1 shown below.

Figure 6A:
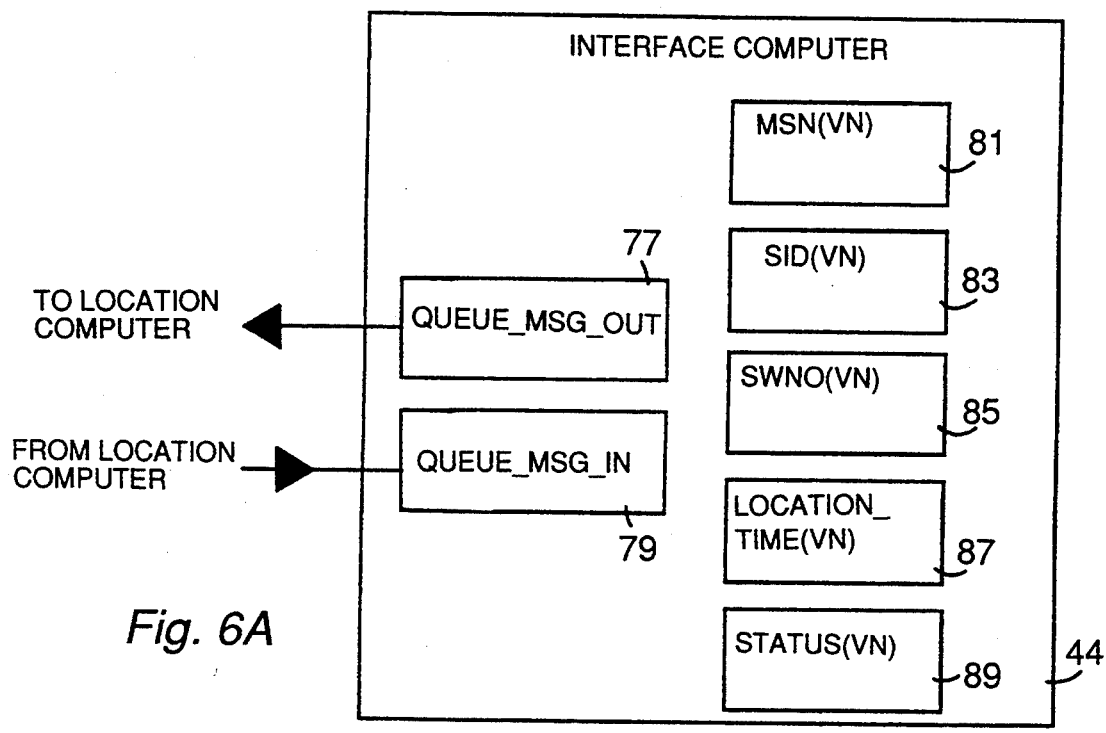
FIG. 6A is a schematic diagram of memory locations for a typical interface computer according to this invention.

The main registers are shown again in FIG. 6a. These include the message transfer file memories for QUEUE_MSG_OUT 77 and QUEUE_MSG_IN 79, which are the buffers that store messages received from the location computer or bound to the location computer. The other main memory locations are: STATUS(VN) 89 which indicates whether particular vehicle is found, not found, or should not be looked for;

MSN(VN) 81, which relates vehicle number VN to the serial number of the vehicle's CSS; SID(VN) 83 and SWNO(VN) 85, which contain the latest MSN information on vehicle VN; LOCATION_TIME(VN) 87 which indicates the last time at which SWNO(VN) and SID(VN) were last updated for vehicle VN.

Table 2 shows the messages passed between the Interface and Location Computers. In general, the Location Computer sends messages to the Interface Computer(s) to initiate or discontinue the search for particular vehicle(s), under control of a user. The Location Computer may also send commands to monitor the operations of the Interface Computers. On the other hand, the Interface Computer(s) send messages to the Location Computer to relay any new information obtained regarding vehicles that they were previously instructed to track, or to signal technical problems.

Messages sent by the location computer 46 may be received by the interface computer(s) at any time, and are stored in QUEUE_MSG IN until processed by the procedure depicted in FIG. 6. Messages sent by the interface computer to the location computer 46 are stored in QUE_MSG_OUT before transmission. This file comprises all location messages received in the latest round of CSS location processing. The actual transmission is performed in this embodiment at step 87 of procedure 79 shown in FIG. 6. However, the transmission of QUEUE_MSG_OUT may occur at any time subsequent to the receipt of new location data by the computer and may, in fact, occur by direct transmission of the data to the location computer without the use of storage file.

TABLE I

| DATA STRUCTURE FOR INTERFACE COMPUTER | | |
| --- | --- | --- |
| Variable Name | Type | Purpose |
| VN_MAX | Integer | Arbitrary number equal to the maximum number of vehicles tracked by the system |
| TIME_NOW | Integer | Number of seconds elapsed from arbitrary point in time such as 12:00 am, January 1, 1991 |
| MSN(1 ... VN_MAX) | Array of integers | Unique serial number of the phone on-board vehicle VN |
| SID(1 ... VN_MAX) | Array of integers | Identification number of the system that last served vehicle VN |
| SWNO(1 ... VN_MAX) | Array of integers | Identification number of the switch that last served vehicle VN |
| LOCATION_TIME(1 ... VN_MAX) | Array of integers | Time of last successful retrieval of SID and SWNO from Home Location Register (HLR) |
| STATUS(1 ... VN_MAX) | Array of integers | Status of VN within the interface computer where 0 = look for 1 = found 2 = do not look for |
| QUEUE_MSG_OUT | ASCII file | Queue of messages bound for the Location Computer |
| QUEUE_MSG_IN | ASCII file | Queue of messages inbound from the Location Computer |
| INT_COMP_ID | Integer | Unique number assigned to each Interface Computer |
| ROAM_NET_ID | Integer | Unique number of the roaming network to which the INT COMP HLR belongs |
| VN | Integer | Vehicle number |
| SID | Integer | Identification number of a system |
| SWNO | Integer | Identification number of a switch |
| MSN | Integer | Unique mobile serial number of the phone on-board a vehicle |
| T1 | Integer | Time storage variable |
| DELAY | Integer | Amount of time in seconds between HLR queries |

TABLE 2

| LIST OF MESSAGES PASSED BETWEEN INTERFACE AND LOCATION COMPUTERS | | | | |
| --- | --- | --- | --- | --- |
| Msg ID | From | To | Parameters Passed | Description |
| 1 | Interface Computer | Location Computer | 1, VN, SID, SWNO, TIME, INT_COMP_ID, ROAM_NET_ID | "Lost vehicle is found and located |
| 2 | Interface Computer | Location Computer | 2, VN, SID, SWNO, TIME | Vehicle has moved to a new location |
| 3 | Interface | Location | 3, VN, TIME | Vehicle has been found in |

TABLE 2-continued
LIST OF MESSAGES PASSED BETWEEN INTERFACE AND LOCATION COMPUTERS

| Msg ID | From | To | Parameters Passed | Description |
| --- | --- | --- | --- | --- |
| | Computer | Computer | | the same location as previously |
| 4 | Interface Computer | Location Computer | 4, VN, INT_COMP_ID, ROAM_NET_ID, TIME | Vehicle not found |
| 5 | Location Computer | Interface Computer | 5, VN, MSN | Look for vehicle VN |
| 6 | Location Computer | Interface Computer | 6, VN | Do not look for vehicle VN |
| 7 | Location Computer | Interface Computer | 7, VN | Service call, read all data fields associated with VN |
| 8 | Location Computer | Interface Computer | 8, VN, MSN, SID, SWNO | Service call, modify data stored for VN |
| 9 | Location Computer | Interface Computer | 9, RESTART | Service call, enter the re-initiation procedure |
| 10 | Interface Computer | Location Computer | 10, INT_COMP_ID, ROAM_NET_ID, TIME | Failure to log on to switch |

Procedure 79 of FIG. 6 begins by initializing variables in step 80. A variable, VN_MAX, is set to the maximum number of vehicles to be tracked by the system. A variable, INT_COMP_ID, is then set to a unique identification number assigned to the interface computer. A variable, DELAY, is set to an arbitrary number of seconds (typically less than 5). Another variable, ROAM NET_ID, is then set to 1 and all STATUS(1 ... VN_MAX) flags are set to 2, indicating that the system should search for no vehicles. Other associated variables are reset to 0 according to this embodiment.

The interface computer subsequently attempts to log in to the MSC (40$_{HOME}$ throughout this description) to access the HLR 50$_{HOME}$ database, step 82, by following a predetermined communications script. This script varies according to the log-in procedure of the specific switch (MSC) to be tapped. If the log-in procedure fails, the interface computer 44$_{I-III}$ branches to step 84 and transmits a Log-in Failure message to the location computer, indicating a Log-in failure, and then returns control to Log-in step 82 again. Once Log-in is achieved, the interface computer sets a time storage variable T1 to the current system clock time, TIME_NOW, in step 86. Once the time is registered, the interface computer searches a register QUEUE_MSG_IN in step 88 for messages sent from the location computer. As noted before, the location computer may send messages to the interface computer at any time during the procedure. A typical message may relay to the Interface Computer the identifications of CSSs (vehicles) to be located in the roaming network. These vehicles are usually all or part of a particular customer's fleet. These messages are processed in step 88. After interpreting the messages read from QUEUE_MSG_IN in step 88 the interface computer enters a loop 90 that counts through all of the vehicle numbers (an arbitrary number VN) in the fleet from 1 to VN_MAX. If no messages were received from the location computer since start-up, then the interface computer would be looking for no vehicles as all STATUS(VN) 89 registers would still be equal to 2. Given this condition, loop 90 would be completed without querying the HLR of the MSC because the decision step 98 would always branch back to step 92, without ever executing steps 100 through 130.

When the interface computer(s) receive a message via QUEUE MSG_IN to Locate Vehicle VN, the interface computer receives both the identifier VN of the vehicle and the MSN of the vehicle's CSS. A procedure (not shown) interprets these messages. When a Locate Vehicle VN message is received, the MSN that is associated with the vehicle's CCS (vehicle VN) is stored in a register termed MSN(VN). Additionally, the variable STATUS(VN) for the vehicle VN is set to 0 at this time, indicating that the interface computer must search for vehicle VN.

As before, loop 90 counts through each vehicle VN to the maximum number of vehicles, indicated by the variable VN_MAX, for a particular fleet to be located. The counting begins in increments of one in the step 92. If the maximum (VN_MAX) number of vehicles has been exceeded by step 92 (e.g., VN>VN_MAX) then the variable VN is reset to 1 in step 94. The loop proceeds to decision step 96 wherein if VN equals VN_MAX and if the flag STATUS(VN) for the vehicle VN equals 2 (which is always the case for VN=VN_MAX) then the procedure returns via branch 97 to the main routine step 86.

From decision step 96, if conditions for return are not met as described above, the procedure continues to decision step 98. If the STATUS(VN) flag for vehicle VN equals 2, then the procedure returns via branch 99 to loop counting step 92 since the vehicle VN is to be ignored (based upon STATUS(VN)=2, indicating that the vehicle should not be looked for). If, however, STATUS(VN) is not equal to 2 the procedure enters a decision step 100 which loops via branch 101 until a delay time represented by the variable DELAY is reached. The procedure then enters the HLR access step 102 and attempts to access the home switch 40$_{HOME}$ to ascertain the switch and system in which vehicle VN is located.

The interface computer(s) 44$_{I-III}$ issue a database command to the MSC in step 102 querying its HLR register (84) for the SID and SWNO (also known as SWID) that is associated with the MSN of the vehicle's CSS, an MSN number corresponding to the variable MSN(VN). A particular communication script would be employed to accomplish the querying procedure. This script, of course, would vary according to the particular switch to be tapped. If the interface computer fails to contact the MSC, control is immediately transferred to the Log-in procedure 82, via branch 104, and the Log-in procedure 82 attempts to reestablish communications with the MSC.

Assuming that the interface computer successfully contacts the MSC, it branches to decision step 106. In decision step 106 the interface computer procedure determines whether an associated SID and SWNO has been read from the HLR for the particular vehicle VN. If not, the vehicle is not found and the procedure branches to decision step 108. If vehicle VN was previously not found, as indicated by STATUS(VN) equal to 0 (e.g., STATUS(VN) not equal to 1), then the decision step 108 branches down branch 110 to step 112, which sets the flag STATUS(VN) to 0. The procedure then branches down branch 114 back to step 86, where the time variable T1 is reset. The procedure then reenters step 88, searching for a new message from the location computer. Execution of the main loop then continues.

If, at decision step 106, the interface computer does successfully contact the MSC and retrieves an SID and the SWNO for vehicle VN then the vehicle has been found; the procedure continues from step 106 to step 116. If the vehicle were previously not found, as indicated by STATUS(VN) equal to 0, then decision step 116 branches to step 118, which relays to the location computer (via the file QUEUE_MSG_OUT) a message indicating that vehicle VN, previously not found, is now found. The message indicates the vehicle's VN, the newly determined SID and SWNO, the current time, the ID of the interface computer INT COMP_ID, and the id of the roaming network ROAM_NET_ID. Next, step 120 stores the SID and SWNO information obtained from the MSC in SID(VN) and SWNO(VN) registers respectively. In addition, the variable LOCATION_TIME(VN) is set to the value of variable TIME NOW to record the time when vehicle VN has been found. The flag STATUS(VN) is set to 1 in step 122, that follows step 120, to indicate that the vehicle VN has been found. Note that the data transferred by the Vehicle Found message to the location computer (e.g., variables VN, SID(VN), SWNO(VN), LOCATION_TIME(VN), INT COMP_ID(VN), ROAM_NET_ID(VN)) in step 118 makes possible the determination by the location computer the position of the vehicle at a point in time as well as a determination of which interface computer, $44_I$, $44_{II}$ or $44_{III}$, has detected the vehicle.

If the vehicle has already been found by the interface computer such as described hereinabove, and, in a subsequent loop by the interface computer, the MSC is again queried, via loop 90, in step 102, for the vehicle's SID and SWNO numbers then the interface computer will undertake one of the following actions:

If an entry for MSN(VN) is found in the HLR of the MSC in step 102, the procedure branches from decision step 106 to decision step 116. Since the variable STATUS(VN) equals 1, decision step 116 then branches to decision step 124. If the SID and SWNO numbers correspond to the previously stored SID(VN) and SWNO(VN) for that particular vehicle VN, then the vehicle has not moved from the previous location and the procedure branches to step 126. A same location message is sent to the location computer via the file QUEUE_MSG_OUT in step 126 indicating that the vehicle has not moved. The time that the vehicle is detected represented by the variable LOCATION_TIME(VN) is also sent to the location computer from the interface computer in subsequent step 128 to update the location computer record on vehicle VN.

If, as before, an entry for MSN(VN) is found in the HLR of the MSC in step 102, but decision step 124 determines that the SID and SWNO numbers do not correspond to the previously stored SID(VN) and SWNO(VN) for that particular vehicle VN, then the vehicle has moved from the previous location. Decision step 124 then branches to step 130, which sends a moved vehicle message to the location computer via the file QUEUE_MSG_OUT, indicating that the vehicle has moved. The new SID and SWNO obtained from the MSC are sent to the location computer, along with the time when the vehicle is detected (represented by LOCATION_TIME(VN)). Step 130 then branches to step 120, which updates the SID(VN), SWNO(VN) and the LOCATION_TIME(VN) registers with the newly acquired up-to date information. Next, the main loop is reentered via steps 122 and 86, described before. If no entry for the variable MSN(VN) is found in the HLR of the MSC for vehicle VN is step 102, then the previously located vehicle has now been lost by the interface computer. Decision step 106 thus branches to decision step 108. Since the variable STATUS(VN) equals 1, decision step 108 branches to step 128, which appends a vehicle not found message (including the vehicle's VN, the ID of the interface computer INT_COMP_ID, the id of the roaming network ROAM_NET_ID and the current time) to QUEUE_MSG_OUT, the queue of messages bound for the location computer. The procedure then branches to step 110 and resets the flag STATUS(VN) to 0 in step 112, to indicate that the vehicle is not found. The procedure then branches down branch 114 back to step 86, where the time variable T1 is reset and the loop main is continued.

The location computer 46 can prevent the interface computer(s) $44_{I-III}$ from searching for a specific vehicle for any of a variety of reasons. To prevent the search, the location computer sends a Do Not Search For Vehicle VN message to the interface computer. This message indicates the VN of the vehicle to be ignored. The Process QUEUE_MSG_IN subroutine (not shown) responds to the message by setting the variable STATUS(VN) for vehicle VN to equal 2. This assures that the MSC will not be queried for the SID and SWNO of the ignored vehicle identified by MSN(VN).

The location computer 46 may also transmit certain additional commands to the interface computer(s) $44_{I-III}$ to remotely start its (their) operation. A Restart message will accomplish this function. The location computer may also remotely change certain variables using a Modify Data message and may remotely read certain variables using a Read Data Associated With VN message. The implementation of these service routines may be accomplished by a variety of procedures.

In summary, the procedure described above allows the location computer 46 to instruct each interface computer $44_I$, $44_{II}$ and $44_{III}$ to initiate and complete searches for certain vehicles; receive from the interface computer(s) $44_{I-III}$ transmitted changes in HLR data relative to each vehicle, and receive and display an alarm message if an interface computer(s) fails to gain access to its interconnected MSC.

Reference is now made to the location computer 46. The main function of the location computer 46 is to coordinate the interface computers, to concentrate all HLR data from the interface computer(s) $44_{I-III}$, to compute the position of the vehicles, and forward this information to the appropriate mailboxes in the electronic mail system 61. The electronic mail system 61, in turn, forwards this information to the customer site(s) 60.

Location Computer Procedure

Figure 7:
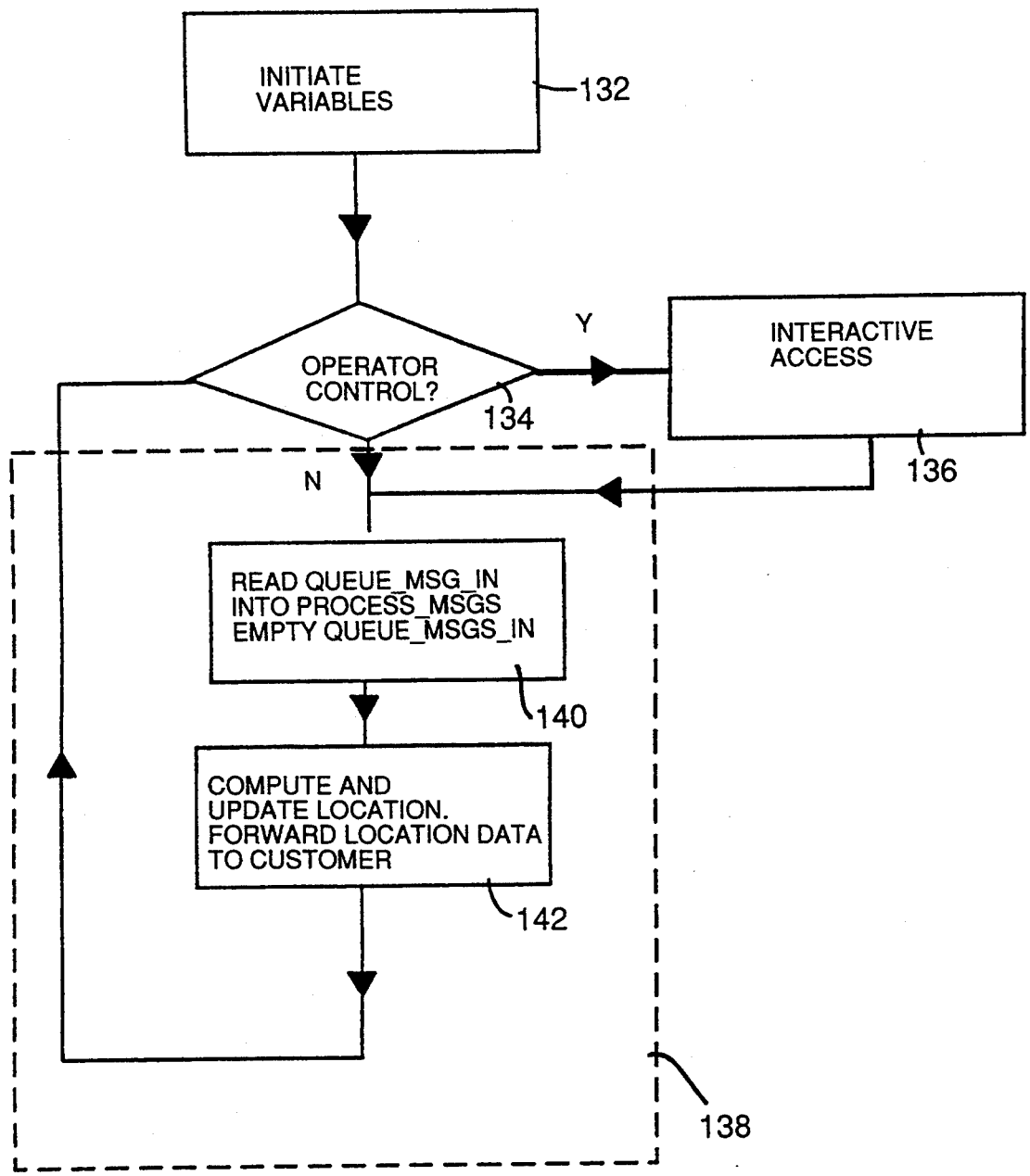
FIG. 7 is a flow diagram of a procedure for use by the location computer of FIG. 5.

The location computer 46 executes the main procedure shown in FIG. 7. Table 3 below defines the corresponding variables for the associated location computer data structure. The location computer begins execution of this routine by initializing all variables in step 132. In the initialization step, the variable INT_COMP_MAX is set to equal the number of interface computers in the system, the variable VN_MAX is then set to equal the maximum number of vehicles tracked by the system and the variable SID_MAX is set to the highest SID number for all cellular systems in the roaming network. Additionally, all STATUS(1 ... VN_MAX) flags are set to equal 2, indicating that the system should search for no vehicles. All other variables are reset to 0. If the system is initialized for the first time, all interface computers $44_{I-III}$ are reset by sending a Restart message to each of them.

The location computer main procedure subsequently verifies whether or not the operator is attempting to gain manual control of the system in decision step 134. If so, then the location computer procedure branches to step 136 and receives any operator instructions, such as search requests and parameters. If no access by an operator is attempted, then the location computer enters a loop 138 in which, in step 140, it first reads all messages received from the interface computer(s), which are queued in the file QUEUE_MSG_IN. These messages are placed into a PROCESS_MSGS file in which they can be acted upon. This procedure is described further below. The location computer procedure then, in step 142, computes, based upon the data in the PROCESS_MSGS file, the new location for the associated vehicles and then forwards the information to the Store and Forward system 61 mailboxes corresponding to the home offices (customer site) 60 of the vehicles. If no messages are received from the interface computers, then no action is taken by the location computer.

Control of the location computer begins when the operator instructs the location computer to search for one or more vehicles. The operator enters each vehicle's VN number and the MSN of its associated CSS. The operator also enters a list of mailboxes to which location information should be forwarded corresponding generally to customer sites. These parameters are stored in the variables VN, MSN(VN) and MAILBOX(VN) respectively. The location computer procedure then determines (not shown) which interface computer is handling the least number of vehicles, and then assigns the new vehicle(s) to the least occupied interface computer by sending a Search For Vehicle VN message. Thus STATUS(VN) flag for each new vehicle VN is set to 0, indicating that the new vehicles having numbers VN are not yet found.

As discussed above, the interface computer(s) $44_{I-III}$ report changes in the HLR data associated with each vehicle VN to the location computer 46. These messages are read from the new QUEUE_MSG_IN register into the temporary file PROCESS_MSGS and processed in sequence by the COMPUTE AND UPDATE LOCATION procedure 144 shown in FIG. 8. The following is a description of the various messages from the interface computer processed by the location computer in this procedure as it reads the PROCESS_MSGS file in step 144, also described in step 140 of the main procedure in FIG. 7. These messages are listed generally in Table 2.

A Log-in Failure message, indicating that the interface computer is unable to log-in to its MSC, causes the location computer procedure to branch from initial decision step 146 to read values for variables INT_COMP_ID, ROAMNET_ID and TIME in step 148 and to display in step 150 an alarm message to the operator indicating the identifier (the ID) of the specific interface computer experiencing Log-in failure. The message is then deleted from the PROCESS_MSGS file in step 152 and the procedure returns via step 154 to read the next message in PROCESS_MSGS at step 44.

Any message read from the PROCESS_MSGS file other than Log-in Failure causes the decision step 146

TABLE 3

DATA STRUCTURE FOR LOCATION COMPUTER (Single Roaming Network)

| Variable Name | Type | Purpose |
| --- | --- | --- |
| SWNO_MAX | Integer | Highest number of switches in any given cellular system covered |
| INT_COMP_MAX | Integer | Number of interface computers tapping each roaming network |
| VN_MAX | Integer | Arbitrary number equal to the number of vehicles tracked by the system |
| SID_MAX | Integer | Highest SID number of this cellular system covered |
| TIME_NOW | Integer | Number of seconds elapsed from arbitrary point in time such as 12:00 am, January 1, 1991 |
| MSN(1 ... VN_MAX | Array of integers | Matches on-board phone serial numbers with particular vehicles |
| SID(1 ... VN_MAX) | Array of integers | Identification number of the system that last served vehicle VN |
| SWNO(1 ... VN_MAX) | Array of integers | Identification number of the switch that last served the vehicle VN |
| LOCATION_TIME(1 ... VN_MAX) | Array of integers | Time of last successful retrieval of SID and SWNO from home location register (HLR) |
| STATUS(1 ... VN_MAX) | Array of integers | Status of VN within the location computer where 0 = look for 1 = found 2 = do not look for |
| LAST_LOCATION(1 ... VN_MAX) | Array of strings | Tells where vehicle VN was last located |
| MAILBOX(1 ... VN_MAX) | Array of list of strings | Matches vehicle with the list of the dispatcher's electronic mailboxes |
| LOAD(1 ... INT_COMP_MAX) | Array of integers | Number of vehicles assigned to interface computer INT_COMP_ID in roaming network ROAMNET |
| LOCATION(1 ... SID_MAX), 1 ... SWNO_MAX) | Array of strings | Tells where vehicle VN was last located |
| QUEUE_MSG_IN | ASCII file | Queue of messages inbound from the interface computer |
| QUEUE_MSG_OUT | ASCII file | Queue of messages bound for the interface computer |
| MIN | Integer | Temporary holder of minimum load | to branch 156. A Found Vehicle message, indicating that a previously unlocated vehicle is now located, causes the location computer procedure in decision step 158 to branch to step 160 in which the values for variables VN, SID, SWNO, TIME, INT_COMP_ID and ROAMNET_ID transmitted with the message are read. This information is stored by the location computer in registers SID(VN), SWNO(VN), LOCATION_TIME(VN), INT COMP_ID(VN) and ROAMNET_ID(VN) respectively for the particular VN in step 162. STATUS(VN) is also set to 1, indicating that vehicle VN is now located. Variables SID(VN), SWNO(VN) and LOCATION TIME(VN) are then set equal to the read associated values for vehicle VN in step 164. The location computer procedure 144 then calls in step 166 a COMPUTE LOCATION subroutine (not shown but described below) to determine the new position of the vehicle. This subroutine involves comparison of a list of known geographical locations with associated switch and system identification numbers (SWNO(VN)and SID(VN) respectively) for the corresponding vehicle VN. The location of the vehicle is stored in a data string LOCATION(VN) via the subroutine COMPUTE LOCATION. The vehicle's position is then forwarded to the mailbox(es) (as identified by the variable MAILBOX(VN)) corresponding to the vehicle's home base(s) in step 168 along with the time in which vehicle VN was found. The message subsequently is deleted form PROCESS_MSGS in step 152 and the next message is then read by the location computer 46 in step 144.

A Moved Vehicle message indicating that a previously found vehicle has moved, causes the location computer procedure to branch from decision step 158 to decision step 170 wherein a Moved Vehicle message causes the procedure to branch to step 172. Values for the variables VN, SID, SWNO and TIME included with the message are read in step 172 and the procedure branches to step 164 to store this information in the registers SID(VN), SWNO(VN) and LOCATION_TIME(VN) for vehicle VN respectively. The location computer then again calls COMPUTE LOCATION subroutine in step 166 to determine the new position of the vehicle and stores this position value in the data string LOCATION(VN). The vehicle's position and time is then forwarded to the mailbox(es) corresponding to the vehicle's home base in step 168, the message is deleted in step 152 and the next message is read by the location computer in step 144.

A Same Location message, indicating that a previously located vehicle has not moved, causes the location computer to branch through decision steps 158 and 170. The message results in branching from step 174 to step 176 wherein the procedure reads the values for the variables VN and TIME transmitted with the message. The location computer then stores the time of location in the register LOCATION_TIME(VN) to update the currentness of the search in step 178. The vehicle's position is then forwarded to the mailbox(es) corresponding to the vehicle's home base(s) in step 168 in a manner described above for a Found Vehicle message. Similarly, the next message is then read by the location computer procedure in step 144.

Finally, a Vehicle Not Found message, read from PROCESS_MSGS, indicating that a previously located vehicle is no longer located, causes the location computer procedure to branch via branch 180 to step 182. In step 182 the procedure reads values for VN, INT_COMP_ID and ROAMNET_ID and stores a value of 0 for the variable STATUS(VN). This 0 value indicates that the vehicle has been lost and causes the transmittal of a message to that effect to the mailbox(es) corresponding to the vehicle's home base(s). The procedure branches via branch 184 to step 152 wherein again, the message is deleted and the next message is then read by the location computer procedure in step 144.

The above-described process continues until all messages stored in the file PROCESS_MSGS are processed. Following completion of the reading of all messages, the procedure returns in step 183 to the main procedure wherein the location computer main procedure verifies whether the operator is attempting to gain control of the system per step 134 of FIG. 7. If so, the operator instructions are read. If not, then the next batch of inbound messages is then read from the QUEUE_MSG_IN file into the temporary file PROCESS_MSGS, and the loop 138 continues.

Figure 8:
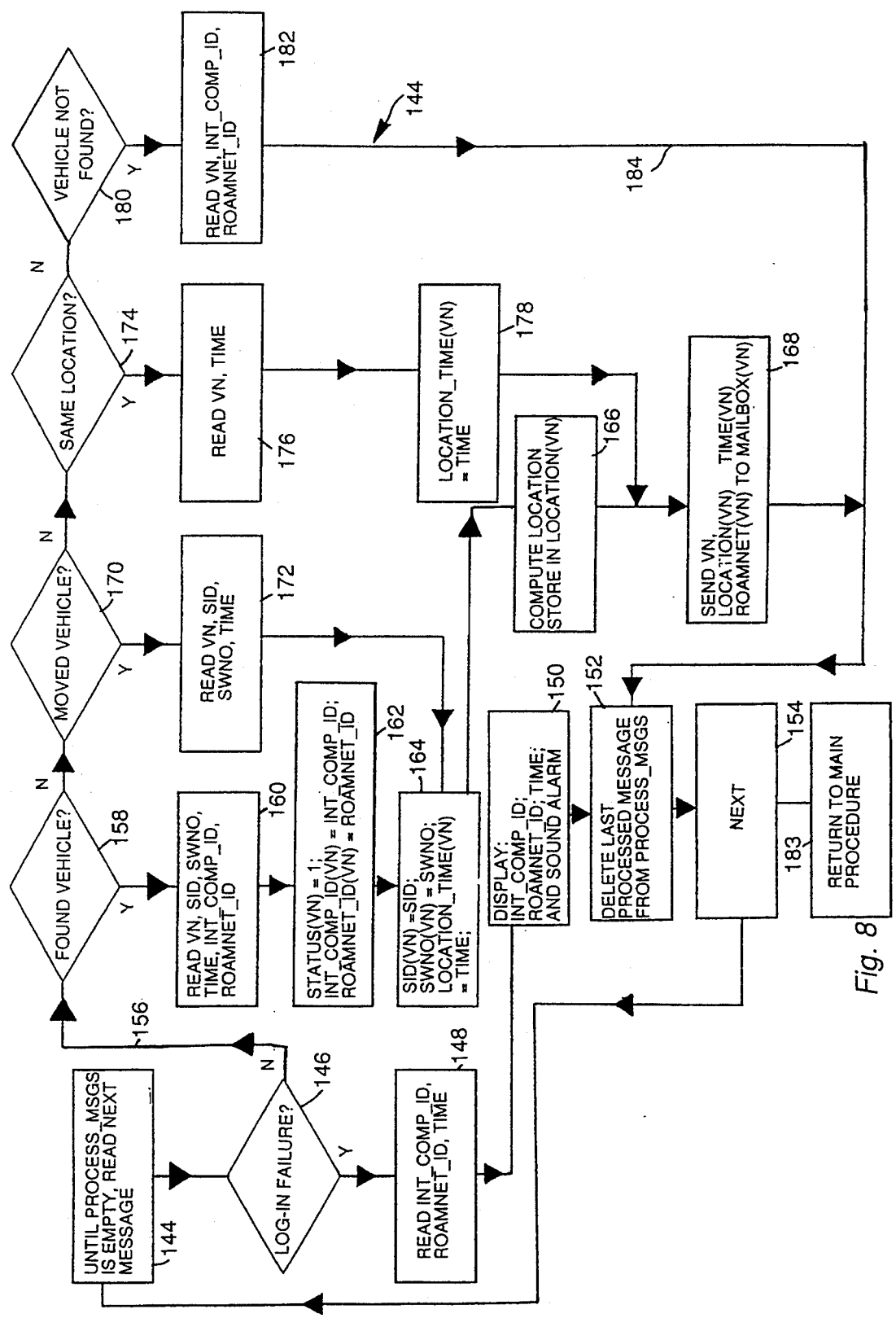
FIG. 8 is a flow diagram of the location update procedure for use by the location computer based upon reported changes from the interface computer of FIG. 5.

As discussed above, Found Vehicle and Moved Vehicle messages cause the location computer procedure 144 to call a subroutine COMPUTE LOCATION, in step 166 of FIG. 8, which determines the vehicle's current location. In particular, this subroutine reads the latest HLR data for the particular vehicle VN from the corresponding values stored for variables SID(VN) and SWNO(VN). The subroutine then determines the location of the vehicle by reading the entry corresponding to the variables SID(VN) and SWNO(VN) in a variable matrix LOCATION(1 ... SID_MAX, 1 ... SWNO_MAX) or an equivalent data structure. This procedure essentially involves a table look-up. Each entry in this matrix comprises the location of the area served by a switch number SWNO in the cellular system number SID. This information may be stored in ordinary descriptive text, geographic area form or in any other form that indicates location. The contents of this matrix may be derived directly by gathering coverage information from the FCC and/or various cellular operators. Similarly, the information may be derived empirically by locating one or more CSSs at various known positions, and then recording the SID and HLR readings reported by the system for each of these positions. Once the vehicle's position is determined, it may be stored in the register LAST LOCATION(VN)(See Table 3 below).

Hardware Requirements

As shown in FIGS. 2 and 3 generally, the information obtained by the interface and location computers, 44 and 46 respectively, is transmitted to the electronic mail system 61 for transfer to terminals 62 and other output/display devices at the customer site(s) 60. At the site 60, the customer may manipulate, or otherwise utilize, data to track the location of its fleet of vehicles. The main purpose of the Store and Forward electronic mailbox system 61 is to relay position data from the location computer to the customer's site(s) and to relay text and data messages between the vehicles and the customer's site(s). Store and Forward hardware and software is readily available in today's market. An example of such a system that could be implemented on a Tandem fault-tolerant (OLTP) computer is the Easy Mail TM software sold by TelcoSolutions, Inc. The Dial-in I/O ports of the Store and Forward system may employ standard modems with a data rate of at least 300 baud, and preferably higher, and should implement an error correction standard such as MNP 4 or better.

Electronic mail Store and Forward systems particularly provide a number of mailboxes acting as storage areas for messages bound for user. Messages are sent to and read from the system by logging on to a communication port and then issuing appropriate commands. In this embodiment, each vehicle is assigned a mailbox for outbound messages (messages sent from the home base to the vehicles), and each home base is assigned a mailbox for inbound messages (messages sent by the location computer 46 and/or the vehicle CSS 35 to the home base(s)60).

According to the location computer procedures depicted in FIGS. 7 and 8, messages comprising the latest location of each vehicle are transmitted to the mailboxes corresponding to the home base(s) 60 of each vehicle. Inbound text and data messages are sent from the vehicle CSS to the appropriate mailboxes via the cellular telephone voice line network using normal placement of calls in a manner described further below.

As important as any other single piece of equipment according to this embodiment, the on-board cellular telephone system (CSS) carried by each vehicle is essential to allow the location of that particular vehicle. In its most basic form, the mobile equipment required by the system according to this embodiment comprises only a basic cellular telephone transceiver unit. The vehicle tracking system of this embodiment does not entail the placement of calls to and from the CSS. However, the system does retain the ability to exchange messages. For example, an answering machine can be attached to this cellular telephone to store an incoming call when the telephone is unattended. However, such a configuration restricts messaging capabilities to voice telephone calls only.

Messaging is a useful part of the vehicle location system according to this invention. The capability to transfer messages to and from the vehicle allows a fleet operator to change the driver's dispatch orders and receive news of vehicle progress from the driver on an ongoing basis. In order to minimize cellular telephone usage, users may opt to exchange messages in data form over the cellular link. By employing this method, a typical message of a few hundred characters may be sent in less than 10 seconds.

Figure 9:
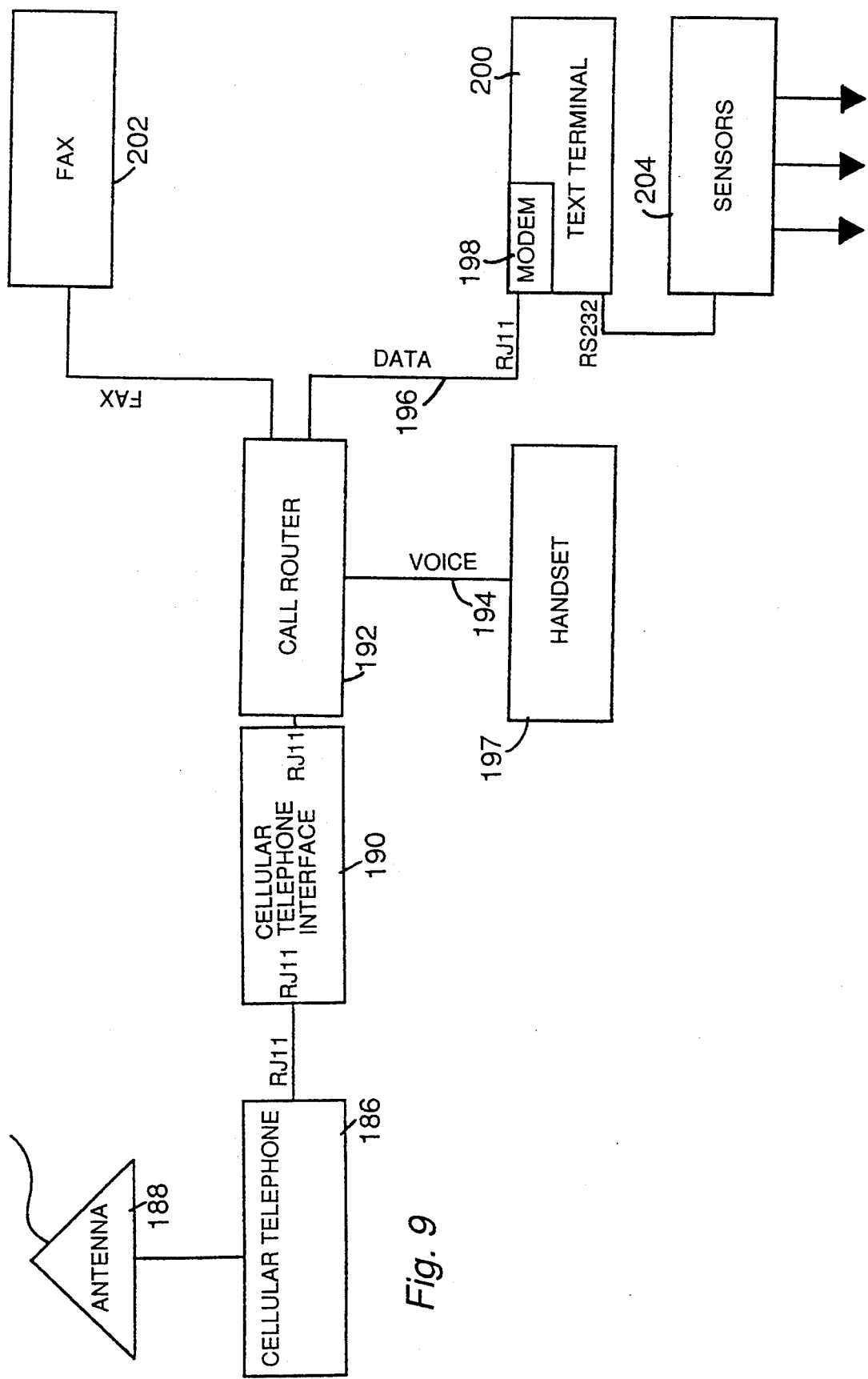
FIG. 9 is a schematic diagram of a typical mobile vehicle cellular telephone configurator including data and facsimile peripherals according to this invention.

FIG. 9 depicts a possible configuration of the mobile equipment according to this embodiment including the required communication links. The cellular telephone 186 having an antenna 188 is linked using an RJ11 communication interface to a Cellular Telephone Interface 190 (such as the CHI TM unit made by Cellars of Canoga Park, Calif. or the Celjack TM unit distributed by Cellular Solutions, Boulder, Colo.). The telephone interface 190 allows standard line-linked telephone equipment to be connected to the cellular telephone. The Telephone Interface is connected to an optional Call Router 192 unit (such as the ASAP TF 555 TM unit made by Command Communications Inc. in Aurora, Colo.), which distinguishes incoming data calls from incoming voice calls and fax calls, and routes the calls to a voice and/or data telephone port 194 and 196 respectively on a unit (handset 197, text terminal 200 and facsimile machine 202) corresponding to that call type.

One of the Call Router ports in this embodiment is connected by an RJ11 data line to a standard auto-answer data modem 198 compatible with Store and Forward electronic mail modems and implementing the same error correction standard. The modem 198 is interconnected to a text terminal 200, composed of a keyboard, display, one or more serial/parallel ports in programmable computer. The text terminal may be implemented on a Tandy 102 TM unit, and Atari Portfolio TM unit or other readily available terminal units.

In order to transmit an inbound text/message, the vehicle's operator enters a data/message in the text terminal 200. The text terminal 200 then automatically inserts a header into the message that indicates the identification numbers of the Store and Forward electronic mailbox(es) (not shown) corresponding to the vehicle's home base(s). The cellular telephone subsequently dials the telephone number corresponding to the DIAL-IN I/O port of the Store and Forward electronic mail system 61. With some Telephone Interface units, such as Celjack TM the dialing command may be issued directly by a computer that is part of the text terminal 200 through the modem 198. With other units, the vehicle's operator must manually instruct the cellular telephone 186 to dial the number which may be preprogrammed in the cellular and accessed via a speed dial feature. The actual call may be delayed until the cellular telephone is within range of a cellular system.

After a cellular connection is established between the vehicle and the electronic mail Store and Forward system 61, the text terminal 200 logs on to the Store and Forward system 61, identifying itself and downloading the data/message(s) into the electronic mailbox system. The mailbox system then forwards a copy of the transmission to each of the mailboxes indicated in the header. The electronic mail system 61 then determines whether the mailbox corresponding to the calling vehicle has any messages to be delivered, and if so, the system uploads these messages to the vehicle's terminal 200. The telephone call is then terminated subsequent to the two-way data transfer.

In order to transmit an outbound message to one or more vehicles, the computer terminal 62 at the vehicle's home base 60 logs onto the Store and Forward system 61 and then downloads the message with a header indicating the vehicle(s) to which the message should be delivered. The Store and Forward system 61 then stores the messages in the mailboxes corresponding to the vehicles and then delivers the messages by dialing the telephone numbers corresponding the cellular telephones in the vehicles until a connection is established. When the vehicle cellular telephone 186 receives a call from the Store and Forward electronic mail system 61, the Telephone Interface unit 190 "picks up" the phone and passes the received information to the Call Router 192, which identifies the transmission as a data call and then forwards it to the data modem 198. The data modem 198 automatically answers the call and instructs the text terminal 200 to store the incoming data/message for later display. Following message receipt, the text terminal 200 may transmit a confirmation message to the Store and Forward system 61 which is subsequently forwarded to the vehicle's home office 60.

In order to receive an inbound facsimile message, the cellular telephone calls the recipients number. With some Telephone Interface units, such as Celjack TM, the dialing command may be issued directly by the facsimile unit 202. With other units, the vehicle operator must manually instruct the cellular telephone to dial the number which, again, may be preprogrammed in the cellular telephone and is accessible by means of a speed-dial command.

In order to transmit an outbound facsimile message to a vehicle, the originating facsimile machine 65 repeatedly dials the number of the vehicle's cellular telephone until a connection is established. Once a cellular telephone call from the facsimile machine 65 is received, the Telephone Interface unit 190 again "picks up" the line and passes the transmission to the Call Router 192. The Call Router 192 identifies it as a facsimile call and forwards it to the on-board facsimile machine 202, which automatically activates to receive the facsimile message.

It should be noted that the above described embodiment for implementing based vehicle messaging is only one possible embodiment. Many of the systems described may be substituted with a cellular modem such as the Cellmodem 2400+ ™ made by Cellars. Additionally, data/text messaging bound for the vehicle need not be delivered over the cellular network, but, rather, could be implemented by means of an alpha numeric paging system which may or may not be interfaced with the mobile equipment described above and depicted generally in FIG. 9.

To avoid line charges incurred in the exchange of data/text messages with vehicles, information could be transmitted and received through a cellular control channel rather than a voice channel. This would necessarily require the modification of the cellular telephone firmware, as well as software on the host and home switches to exchange messages. Clearly, such an approach would increase initial system implementation costs and require the cooperation of a number of system operators. It should be again noted that all messaging systems are an option according to this embodiment and that a primary goal of this invention is the implementation of low cost vehicle location utilizing preexisting cellular control channels that does not require placement of calls in order to track vehicles. In doing so, vehicle location may be pinpointed to a particular switch coverage area.

Location Accuracy Improvements

As discussed above, the accuracy of the basic location system according to this invention is a function of the size of the area served by each cellular switch (MSC). The size of this area may range from a single section of an urban area to a rural area having a radius of more than 60 miles. Of course, it is generally more critical to accurately pinpoint the location of a vehicle in an urban area where a local delivery may be problematic then in a larger rural area in which the vehicles are generally in high speed transit such that accurate pinpointing of location is neither possible nor desirable.

Position accuracy according to an alternative embodiment of this invention may be improved to better than ± ten miles by configuring the system to gather not only SID and SWNO data but to also gather cell site number (Base Station) data for the particular cell in which the vehicle CSS is currently located. For example, the IS.41 software in the "host" switches may be modified to communicate to the home system HLR not only the host SID number and switch number (SWNO), but also the cell number through which the cellular telephone's self-registration is processed. The interface computers $44_{I-III}$ gather and store this additional information, and pass it as an additional parameter to the location computer 46 through Found Vehicle and Moved Vehicle messages. The more accurate position information would then be transmitted to the vehicle's home base(s) 60 using the same mechanism employed by the above-described basic embodiment according to this invention.

The COMPUTE LOCATION procedure, V as discussed with reference to step 166 at FIG. 8, that is implemented in the location computer 46 would be modified to manage the additional information provided by cell numbers. This procedure would read the SID, SWNO and cell number data and then determine the location of a vehicle by reading the entry corresponding to the variables SID(VN), SWNO(VN) and cell number in a three dimensional variable matrix such as LOCATION(1 . . . SID_MAX, 1 . . . SWNO_MAX, 1 . . . CELL_NUMBER_MAX) or an equivalent data structure. In this example, the variable CELL NUMBER_MAX represents the highest possible identification number for a cellular cell. Each entry in this matrix would contain the location of the area served by the cell the variable CELL_NUMBER of switch number SWNO in the cellular system number SID. This information may be stored in normal textual form in geographic area form or in any other form indicating location. As with other location information, the cell number information could be converted to location information either using FCC and/or cellular operator data or empirically. This more accurate position information could be transmitted to the vehicles home base or bases utilizing the same mechanism employed by the basic embodiment according to this invention.

Of course, the more accurate version of the location system according to this embodiment need not be applied to all cellular systems in the roaming network. Rather, it may be utilized on a selective basis to locate vehicles in areas where greater accuracy is desired by the customer or location system operator. If a cellular system were not modified to relay cell information, then the interface computers $44_{I-III}$ could relay a known value for CELL_NUMBER to the location computer 46. This would cause the location computer to default to a two dimensional version of the LOCATION matrix to determine the vehicle's position.

Figure 10:
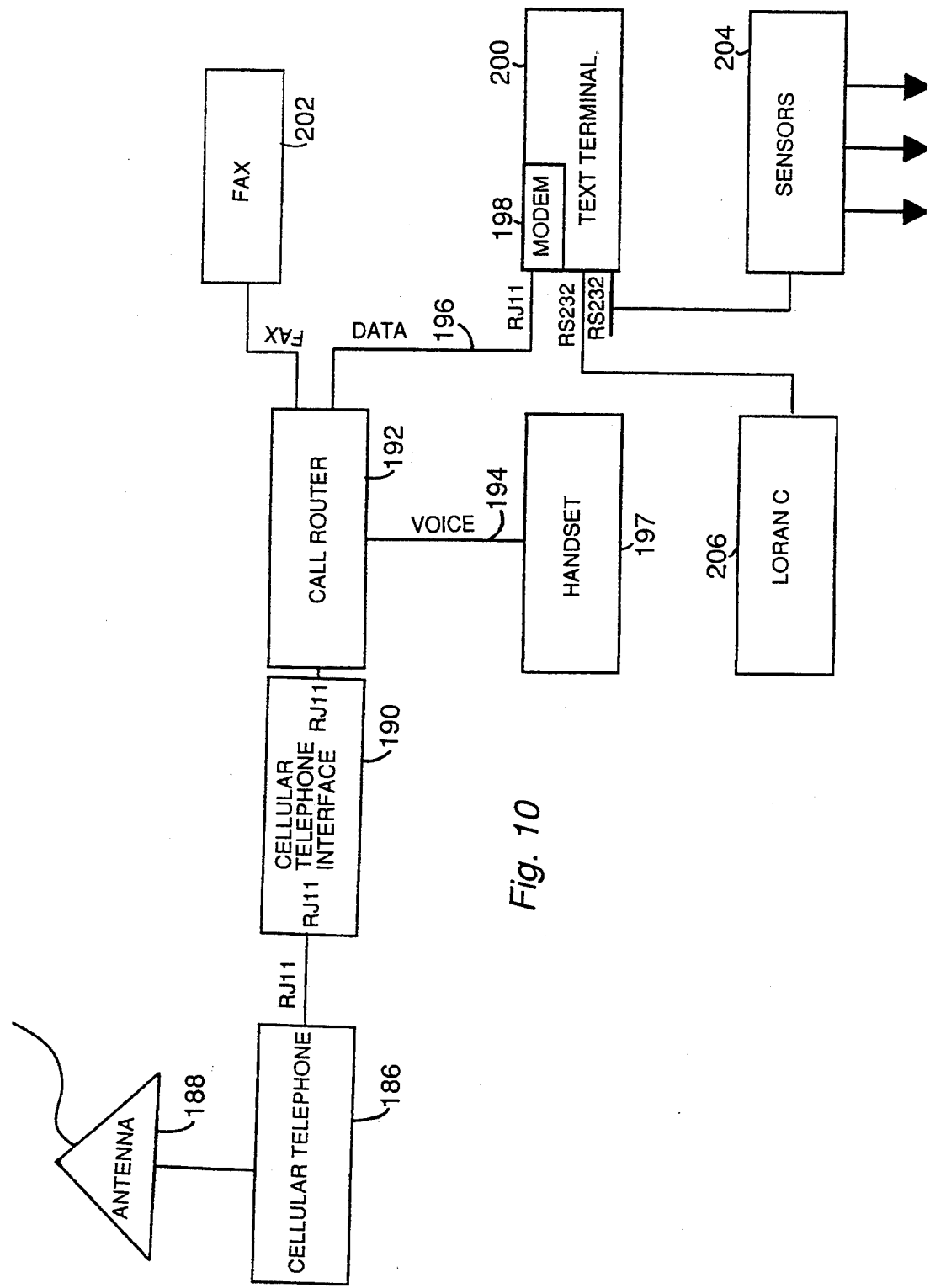
FIG. 10 is a schematic diagram of the mobile vehicle cellular configuration of FIG. 9 including LORAN C for more accurate location determination according to this invention.

Even better accuracy may be obtained according to another alternative embodiment of this system utilizing an outside positioning system in conjunction with the location system according to this invention. For example, a LORAN C receiver or Global Positioning System (GPS) unit or another equivalent receiver may be included in the vehicles on-board equipment. FIG. 10 depicts a mobile vehicle equipment configuration including a LORAN C system 206 interfaced to the text terminal 200 using an RS232 standard data line.

Such a system would operate only on an occasional basis to obtain a higher accuracy fix on vehicle position. The home base could send a position query data message to the vehicle by calling the vehicle's text terminal directly via the vehicle's cellular telephone 186. Alternatively, a position query data message could be sent to the vehicle's mailbox in the Store and Forward system 61 which would then call the mobile telephone 186 and forward the message at an appropriate time. Upon receiving the call, the Call Router 192 identifies the data call and forwards it to the text terminal modem 198, which automatically answers the call. On reading the location query message, the vehicle text terminal 200 reads from the positioning receiver (LORAN C, GPS, etc) the latest position fix and transmits this fix in data form back to the home base 60 or to an appropriate mailbox in the Store and Forward system 61.

In order to avoid line charges occurred in placing a telephone call over the cellular system, the location data gathered from the positioning receiver could be passed to the host cellular switch and then on to the home switch by encoding it in self-registration transmissions sent from the vehicle CSS. Of course, this system would require modifications to the cellular telephone firmware in the vehicle as well as the software in the host and home switches. Such modifications may also be implemented for the cell identification embodiments described above.

In some applications it may also be desirable to incorporate certain sensors into the text terminal or other vehicle telephone interfaces. Such a configuration is depicted for the sensors 204 at FIGS. 9 and 10. The cellular system on board the vehicle would be programmed to automatically forward readings of these sensors to the home base. A typical application would be remote sensing of the temperature of a refrigerator container or the sensing of the opening and closing of cargo doors upon the vehicle. These messages could be encoded and sent through the text terminal which could be programmed to initiate a call if certain conditions were met by the sensors or if certain other events occur.

Multiple Independent Roaming Networks

Figure 11:
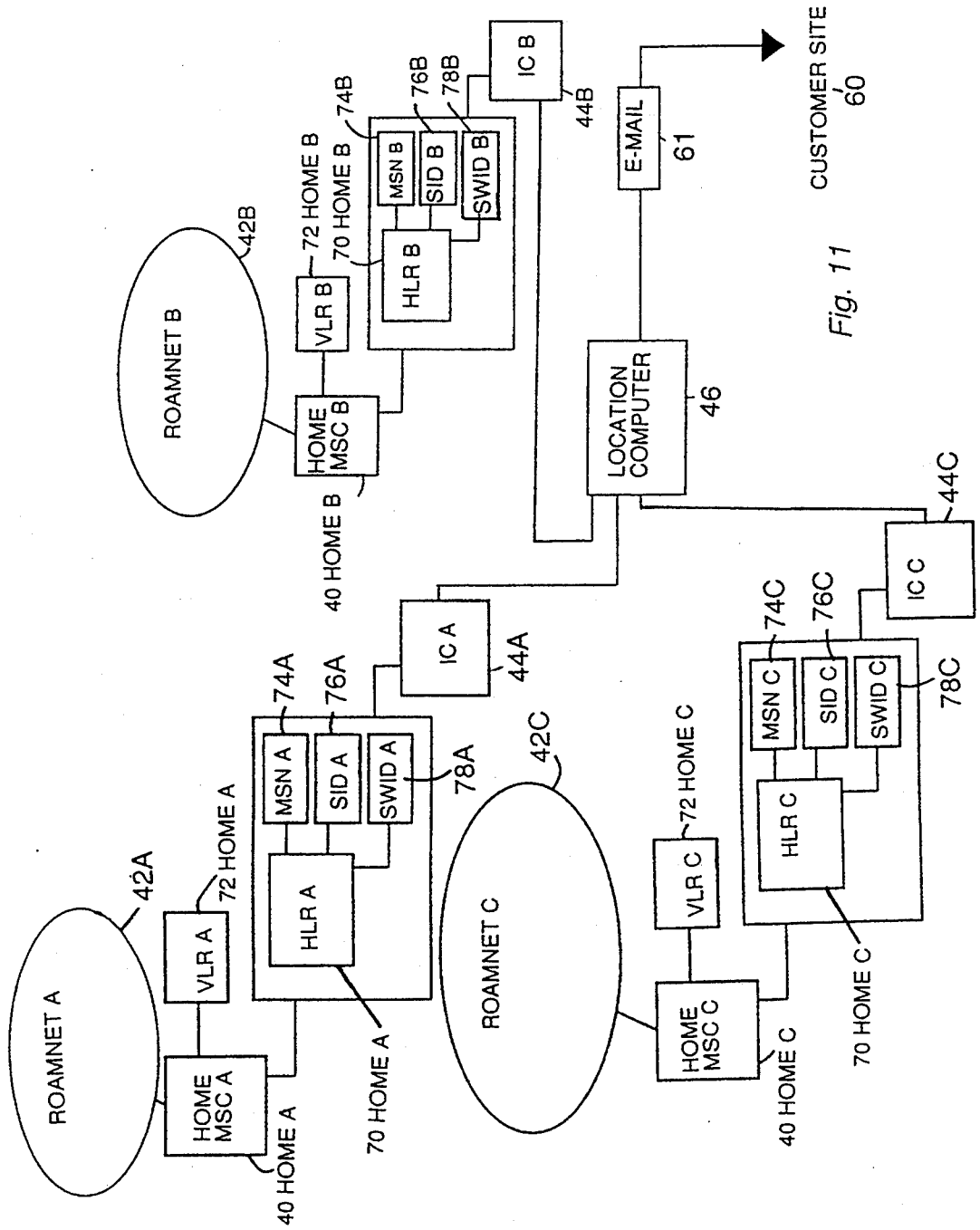
FIG. 11 is a schematic diagram of a vehicle location system according to an alternative embodiment of this invention in which multiple roaming networks are accessed.

In all of the above-described embodiments, it is assumed that one roaming network 42 joins all cellular systems utilized to locate vehicles according to this invention. In other words, all systems in which vehicles are to be found are interconnected via the roaming network 42 to the tapped "home" system and its MSC 40 HOME to which the interface computers $44_{I-III}$ and the location computer 46 are connected (FIG. 5). Since a unified roaming network has not and may not join all cellular systems within a given geographical area such as the United States, it may be necessary to interconnect the interface and location computers of the tapped home system with more than one roaming network in order to obtain adequate location coverage. Such a system is shown generally in FIG. 11. Typically, each individual roaming network 42A, 42B and 42C in such a multiple-network environment could have home system switches $40_{HOME}a$, $40_{HOME}b$ and $40_{HOME}c$ that are each tapped by one or more corresponding interface computers 42A, 42B and 42C each linked to a single cellular system switch, 42A, 42B and 42C respectively, in that network which would act as the network's "home system". The various interface computers 44A–C from each network could then be joined to one or more central location computers 46 that determine vehicle location and send this information on to the Store and Forward electronic mail system 61. A number of modifications to the overall system operating software are then required to determine which roaming network to tap to locate a particular vehicle and when to tap new roaming networks to continue location of a moving vehicle.

As discussed above, a CSS self-registration triggers the transmission of registration notification data to the vehicle home system's HLR. This data includes the SID and SWNO numbers of the host system that now serves the vehicle CSS. As discussed, home systems require this information to forward calls bound for the roaming vehicle to the systems in which they may be reached. IS.41 standard-compatible systems route this information to the CSS's (vehicle's) home system by reading the contents of the CSS's home SID register which is transmitted from the CSS to the host system during the self-registration process. If, however, multiple IS.41 roaming networks exist, the proposed system must insure that the registration notification messages are forwarded to the one cellular system within each roaming network that is tapped.

In one embodiment, the home SID register of each cellular telephone installed on the client's vehicles is set so that all SID numbers are the same. One cellular system in each roaming network is assigned this SID number as well. Thus, each roaming network would, necessarily, contain one cellular system having the same SID number and this number would be assigned to all mobile telephones installed in vehicles to be tracked by the location system. The IS.41 message routing software could then automatically forward the registration notification data to the tapped cellular systems because the SID of each CSS and one switch in the system would match. As pairs of separate roaming networks are joined by IS.41 communication links, one of the two systems with the same SID number would be eliminated, thus insuring that no two cellular systems in the same cellular roaming network would have the same SID number.

An alternative embodiment would involve modifying the cellular telephone firmware to change the contents of the home SID register to match the SID number of the cellular system tapped in the roaming network in which the cellular telephone is currently located. According to the IS.41 standard, the routing software would then automatically forward the registration notification data to the system whose SID number matches that transmitted by the cellular telephone as part of its self-registration procedure. In one implementation, the cellular telephone would determine the desired SID number by reading the SID number of its current host system. As noted, this number is continuously received over the control channel of the cellular system. The telephone would then look up the desired SID number in a table that associates the host system SID to the SID of the system tapped by interface computers in the roaming network of the host system.

Yet another alternative embodiment would require the modification of the software that directs data exchange between various cellular telephone systems. In one implementation, the routing software reads the MSN of each CSS (vehicle) whose data is being sent to the home system. If the MSN matches that of a CSS which is part of a fleet using the location system according to this invention, then the call would not be forwarded to the CSSs home system but, instead, would be routed to the cellular system that is tapped for that particular roaming network by the interface computer.

In all of the above-described alternative embodiments, it is assumed that the home systems of the roaming CSSs are constantly updated with information indicating the identity of the host switch serving the roaming CSSs. Home systems require this information to forward calls bound for roaming CSSs to the systems currently serving them. This function may be achieved through the mechanisms specified in the IS.41 standard, or other mechanisms that the cellular telephone industry, individual service providers, switch manufacturers or other entities may adopt in the U.S. and abroad. In Europe, for example, the mechanism for roaming is dictated by the GSM rather than the IS.41 standard. Regardless of the actual implementation employed, the system according to this invention reads the information maintained by cellular systems to track which part of the system or systems are currently serving a particular CSS. Since the IS.41 standard is at this time the mechanism currently implemented in the U.S., it is assumed that the multiple roaming network implementation described further below relates to systems all utilizing the IS.41 standard.

In the multiple network roaming embodiments described above, the function and operation of the interface computers is essentially the same as that of the basic single roaming network embodiment. One or more interface computers are assigned to at least one cellular system within each cellular network. The main procedure of the interface computer as depicted in FIG. 6 and as described in Tables 1 and 2 is, thus, applicable to this embodiment. The primary difference in the operation of the interface computers 44A-C according to this multiple roaming network embodiment is that the value of the variable ROAMNET_ID, as used throughout the preceding discussion, is not set equal to 1. Rather, it is set to a unique identification (ID) number of the roaming network which the particular interface computer taps. The value for the resulting variable ROAMNET_ID is transmitted to the location computer 46 by a Found Vehicle message to indicate in which roaming network a vehicle numbered VN is traveling. If a value for the variable ROAM_NET ID is, alternatively, transmitted to location computer in a Vehicle Not Found message the interface computer is indicating which roaming network (identified by the variable ROAMNET-ID) is no longer capable of locating the vehicle. Similarly a Log-in Failure message indicates which interface computer is no longer able to access the HLR data from the associated switch (MSC).

The basic function of the location computer 46 in the multiple roaming network embodiment is also similar to that shown for the basic single roaming network embodiment. However, this location computer must also track which vehicles are found in each specific roaming network. It must schedule the search for vehicles across different roaming networks in doing so. In order to minimize the number of HLR queries issued to tapped cellular systems, the location computer 46 limits the search for a vehicle to the smallest possible set of roaming networks. If no location information is available for the particular vehicle in the set of roaming networks accessed, then the search is extended to include all roaming networks. When the vehicle is found, the location computer 46 constricts further searches to the roaming network in which the vehicle is found, and to neighboring networks. If the vehicle is not found for an extended time period, then the search is extended to those roaming networks that could have been reached by the vehicle from its last known position given the time interval since the last position fix.

As in the basic single roaming network embodiment, the location computer 46 forwards to the store-and-forward electronic mail system 61, the location information for each vehicle. An additional parameter passed through the store-and-forward system 61 is the identification number (the variable ROAM_NET ID) of the particular roaming network in which the vehicle is located. This information is used by the store-and-forward system 61 and/or by the home base 60 to reach the CSS of the vehicle in order to send each of data, text, fax and voice messages to it. As in the single roaming network embodiment, the location computer 46 executes a continuous procedure that receives messages from the interface computers and queues them in the register QUEUE_MSG_IN. Loading of the

TABLE 4

| DATA STRUCTURE FOR INTERFACE COMPUTER (MULTIPLE ROAMING NETWORKS) | | |
|---|---|---|
| Variable Name | Type | Purpose |
| ROAMNET_MAX* | Integer | Number of roaming networks tapped |
| SWNO_MAX | Integer | Highest number of switches in any given cellular system covered |
| INT_COMP_MAX_MAX* | Integer | Highest number of interface computers serving any one network of systems |
| INT_COMP_MAX(1 ... ROAMNET_MAX)* | Integer | Number of interface computers serving any one network of systems |
| VN_MAX | Integer | Arbitrary number equal to the number of vehicles tracked by the system |
| SID_MAX | Integer | Highest SID number of the cellular system covered |
| SPEED_CLASS_MAX* | Integer | Number of vehicle classes recognized by the system |
| TIME_NOW | Integer | Number of seconds elapsed from arbitrary point in time such as 12:00 am, January 1, 1991 |
| MSN(1 ... VN_MAX) | Array of integers | Matches on-board phone serial numbers with particular vehicles |
| SID(1 ... VN_MAX) | Array of integers | Identification number of the system that last served vehicle VN |
| SWNO(1 ... VN_MAX) | Array of integers | Identification number of the switch that last served the vehicle VN |
| LOCATION/TIME(1 ... VN_MAX) | Array of integers | Time of last successful retrieval of SID and SWNO from home location register (HLR) |
| ROAMNET_ID(1 ... VN_MAX)* | Array of integers | Tells which roaming network vehicle VN was last in |
| INT_COMP_ID(1 ... VN_MAX,1 ... ROAMNET_MAX)*) | Array of integers | Tells which interface computer in which roaming network last processed VN |
| STATUS(1 ... VN_MAX) | Array of integers | Status of VN within the location computer where<br>0 = look for<br>1 = found<br>2 = do not look for |
| LAST_LOCATION(1 ... VN_MAX) | Array of strings | Tells where vehicle VN was last located |
| MAILBOX(1 ... VN_MAX) | Array of list of electronic strings | Matches vehicle with the list of the dispatcher's mailboxes |
| SPEED_CLASS(1 ... VIN_MAX)* | Array of integers | Speed class of each vehicle |
| LOOK_ROAMNET(1 ... VN_MAX,1 ... ROAMNET_MAX) | Matrix of 1-bit flags | Indicates in which roaming networks vehicles must be "looked for" | messages employs standard transfer protocols described above.

Figure 12:
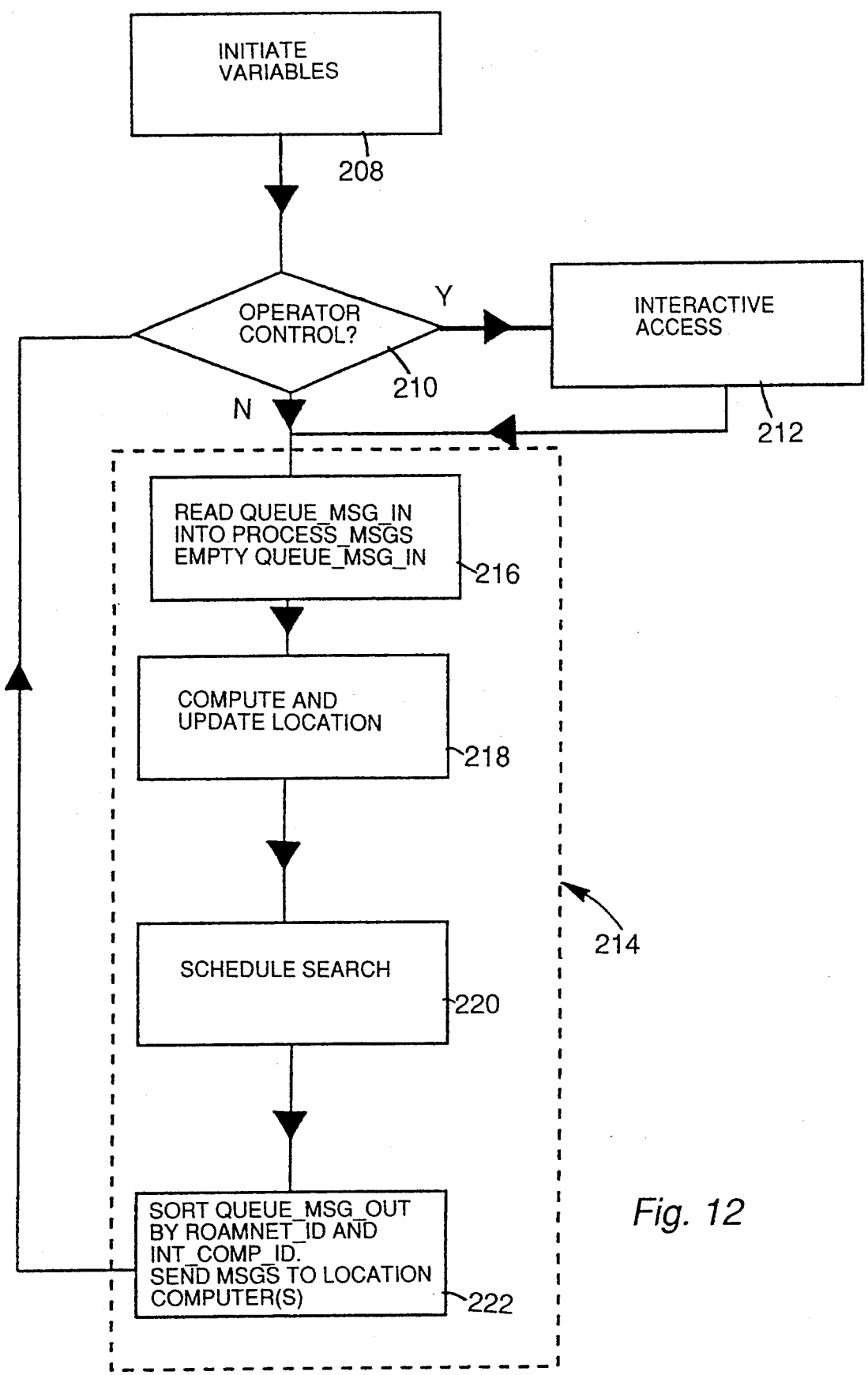
FIG. 12 is a flow diagram of the main procedure for a location computer interfaced with multiple roaming network systems according to the FIG. 11 embodiment of this invention.

For multiple roaming networks, the location computer executes a main procedure as shown in FIG. 12. Table 4 below, similarly, depicts the associated internal data structure for variables utilized in the procedure of FIG. 12. The particular variables added to implement a multiple roaming network embodiment are marked with an asterisk "*".

According to the procedure of FIG. 12, the location computer 46 in step 208 initiates operation by initializing all variables as described in the basic single roaming network embodiment procedure discussed above for FIG. 7. However, the Table 3 variable INT_COMP_MAX is now also set to the number of interface computers of the roaming network that is tapped by the largest number of interface computers. The variable ROAMNET_MAX is set to the number of roaming networks tapped by the system. the variable matrix INT_COMP_MAX(1 ... ROAMNET_MAX) is set to the number of interface computers tapping each roaming network. The variable SID_MAX is set to the highest SID number for all cellular systems in all the roaming networks encompassed in the overall system. Since movement of vehicles between roaming networks may be a factor in this embodiment, the speed of vehicles is taken into account, thus, a variable called SPEED_CLASS_MAX is set to the maximum number of vehicle speed classes (i.e., specific increments of average vehicle speed which may vary based upon vehicle weight, size, ets.) that are recognized by the system. Each vehicle, in particular, is classified according to its maximum predicted travel speed, which influences the rate at which searches are extended when a vehicle is not found. Similarly, the MIN_TRAVEL TIME(1 ... SID_MAX, 1 ... ROAMNET_MAX, 1 ... SPEED_CLASS_MAX) matrixes are each set to the minimum time required for a vehicle having a given value for the variable SPEED_CLASS to reach a particular roaming network (identified by the variable ROAMNET) starting from the geographical area corresponding to a known cellular system. Variable entries for geographically adjacent or overlapping systems and roaming networks (identified by variables SID and ROAMNET_ID) are set to zero regardless of speed class. Variable entries for non-adjacent and non-overlapping systems and roaming networks are set proportionally to travel distance and inversely proportionally to the maximum travel speed associated with the vehicle's speed classification (identified by the variable SPEED CLASS). All other variables and registers are set to zero. If the system is initiated for the first time, then all interface computers in the location system are reset using an appropriate message from the location computer 46.

The location computer main procedure of FIG. 12 subsequently verifies in decision step 210 whether the operator is attempting to gain manual control of the location computer. If so, the procedure allows such access in step 212 wherein the operator can transmit specific instructions to the location computer 46. Otherwise, the location computer 46 then enters a loop 214 in which it first reads all messages received from the interface computers 44A-C in step 216 into the temporary storage file PROCESS_MSGS from the file QUEUE_MSG_IN. The location computer 46 then computes the new location for specific vehicles to be found in step 218 and also updates a matrix indicating the earliest possible of arrival of particular vehicles into each roaming network. The location computer 46 then forwards this information to mailboxes corresponding to the home offices of the particular vehicles located. The location computer in step 220 then reschedules the search for all vehicles that are to be tracked. After appropriate rescheduling commands are sent to the interface computers in subsequent step 222 via the file QUEUE_MSG_OUT, the location computer main procedure loop 214 described above repeats.

Operations of the system according to this embodiment begin when the operator instructs the location computer 46 to search for one or more vehicles identified by the variable VN. The operator enters each vehicle's vehicle identification number VN, and speed class (identified by the variable SPEED_CLASS) and the MSN of its associated CSS. A list of mailboxes to which the location information should be forwarded is also entered. The location computer 46 then determines which interface computer is handling the least number of vehicles and assigns to that interface computer the new vehicles by sending a search for Vehicle VN to the chosen interface computer message. The STATUS(VN) flag for each new, still unsearched and un-located, vehicle VN is set to zero to indicate that these new vehicles are not yet located.

Figure 13:
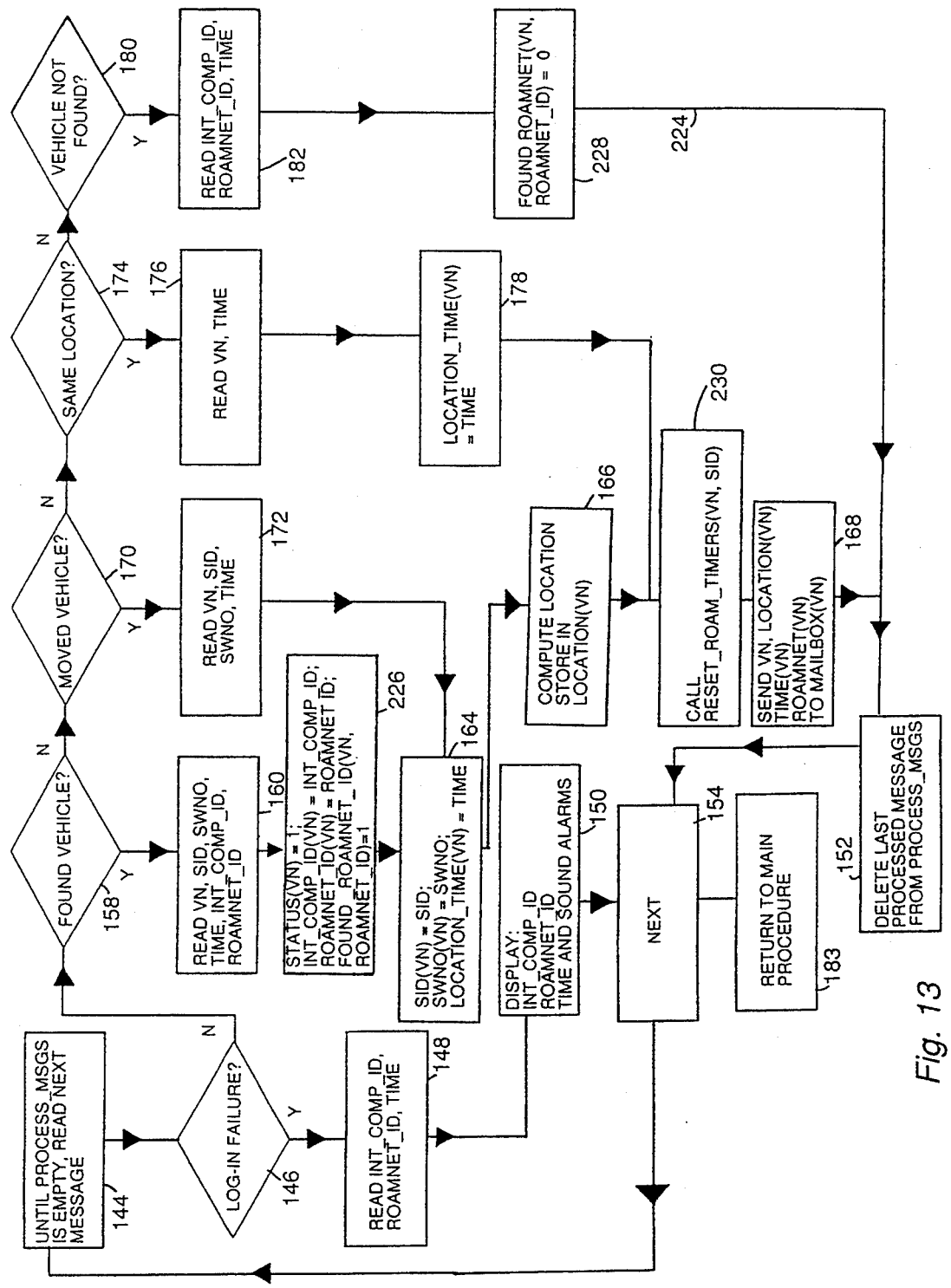
FIG. 13 is a flow diagram of a procedure for use in computing and updating location information by the location computer of FIG. 12.

As described above, the interface computers (44A-C in the FIG. 11 embodiment) report changes in the HLR information associated with each vehicle to the location computer 46. These messages are read from the file QUEUE_MSG_IN into the temporary PROCESS_MSGS file (step 216 in FIG. 12) and these messages are then processed in sequence by the COMPUTE AND UPDATE LOCATION procedure 224 outlined in FIG. 13. This procedure is basically similar to that described in a single roaming network embodiment at FIG. 8 and corresponding reference numerals are employed wherein procedure step 5 are similar, except for the following differences:

1. When a Found Vehicle message is processed in steps 158 and 160, the variable matrix FOUND_ROAMNET_ID(VN, ROAMNET_ID) is set equal to 1 to indicate that the vehicle VN is now detected in the roaming network identified by the variable ROAMNET_ID at subsequent step 226.

2. When a Vehicle Not Found message is processed in steps 180 and 182, the variable matrix FOUND_ROAMNET_ID(VN, ROAMNET ID) is set equal to 0 to indicate that the vehicle VN is not now detected in the roaming network identified by the variable ROAMNET_ID in subsequent step 228.

3. As in the single roaming network embodiment of FIG. 8, Found Vehicle, Moved Vehicle and Same Location messages instruct the location computer 46 to forward the vehicle's position data to the mailboxes corresponding to the vehicles home base(s) 60 at step 168. However, the messages now also include the identification number indicated by the variable ROAMNET(VN) of the roaming network in which the associated vehicle VN was last detected.

4. Found Vehicle, Moved Vehicle and Same Location messages also trigger a call to the RESET_ROAM_TIMERS(VN,SID) procedure shown below in Routine 1 in step 230.

ROUTINE 1

```
RESET_ROAM_TIMERS(VN,SID)
  FOR ROAMNET=1 TO MAX_ROAMNET
    ETA_MIN(VN,ROAMNET)=LOCATION_TIME(VN)+MIN_TRAVEL
TIME(SID,ROAMNET,SPEED_CLASS(VN))
  NEXT ROAMNET
```

This routine (Routine 1) determines the earliest possible time of arrival to all roaming networks of a vehicle VN, given the SID of the MSC that last detected it. This time value is derived from adding the time in which the vehicle was detected to the value for the variable MIN_TRAVEL_TIME(SID,ROAMNET, SPEED_CLASS(VN)) which is defined as the minimum travel time required by a vehicle having a speed classification of SPEED_CLASS(VN) to move from the area served by an MSC having a number SID to the roaming network having a number ROAMNET. The earliest possible time of arrival of vehicle VN to all roaming networks is stored in the register ETA MIN(VN,1 ... MAX_ROAMNET). The value stored in the ETA_MIN for roaming networks that are geographically overlapping or adjacent to the area corresponding to the MSC that last detected the CSS (vehicle) would be less than the current time which indicates that the vehicle may already have arrived in these roaming networks. Conversely, the ETA_MIN would be greater than the current time for roaming networks that are distant from the area corresponding to the MSC that last detected the CSS. The COMPUTE AND UPDATE LOCATION procedure 224 (FIG. 13) terminates when all messages queried in the file PROCESS_MSGS are processed and this register is emptied.

Figure 14:
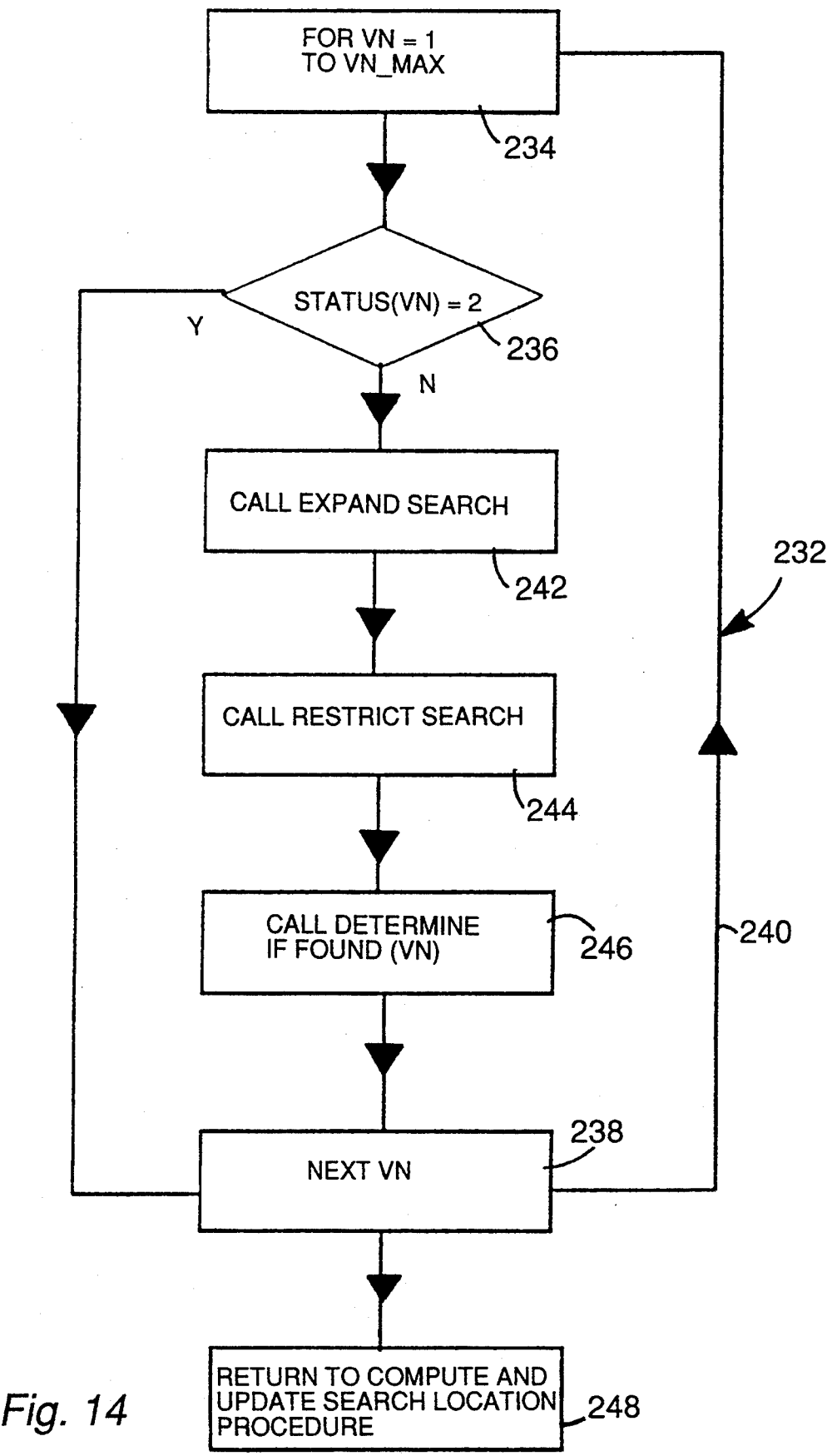
FIG. 14 is a flow diagram of a procedure for expanding and restricting the search for a vehicle based upon its last known location, for use in the multiple roaming embodiment of FIG. 12.

After returning from the COMPUTE AND UPDATE LOCATION procedure 224 to the main procedure via step 183, the main loop 214 (FIG. 12) of the main location computer procedure continues with the entry into the SCHEDULE SEARCH procedure in step 220. This procedure 232 is further described in FIG. 14. This procedure loops through each identified vehicle VN and expands and restricts the search for each active vehicle VN to roaming networks in which the vehicle could be reached based upon its last known position. The procedure 232 counts in step 234 from a VN value of one through the maximum value (VN_MAX) for the variable VN. The procedure, for each VN determines in decision step 236 whether the value of the variable STATUS(VN) for the associated vehicle VN is equal to 2. If so, this vehicle is not to be located and the procedure branches to step 238 which causes a direct return via branch 240 to the VN count in step 234. If the vehicle however is to be searched for (e.g., STATUS(VN) is not equal to 2), then step 236 branches to a series of subroutine calls that expand (step 242) or restrict (step 244) the search and then determine if the vehicle VN is found (step 246). When all vehicles have been looped through. The procedure in step 248 returns to the main COMPUTE AND UPDATE LOCATION procedure 224 in FIG. 13.

The subroutine EXPAND SEARCH 242 is shown in Routine 2 below and determines whether the vehicle could have arrived in the roaming network numbered ROAMNET by determining if the value for the variable ETA_MIN(VN,ROAMNET) is less than the current time and also by verifying whether the system is not already searching for the vehicle VN in the roaming network ROAMNET. If these conditions are met, then the EXPAND SEARCH routine 242 (FIG. 14 and Routine 2) calls the corresponding subroutine entitled ASSIGN INT_COMP(ROAMNET,VN) shown in Routine 6 below.

ROUTINE 2

```
EXPAND SEARCH(VN)
  FOR ROAMNET=1 to MAX_ROAMNET
    IF ETA_MIN(VN), ROAMNET)>TIME_NOW
    AND LOOK_ROAMNET(VN, ROAMNET)=0
    THEN
      ASSIGN INT_COMP(ROAMNET,VN)
      LOOK_ROAMNET(VN,ROAMNET)=1
  NEXT ROAMNET
  RETURN
```

The ASSIGN_INT_COMP subroutine (Routine 6) determines which interface computer in the roaming network ROAMNET has the least number of vehicles assigned to it. The subroutine then instructs this interface computer to search for vehicle VN by appending a Search For Vehicle VN message to the file QUEUE_MSG_OUT.

Similarly, the subroutine RESTRICT SEARCH 244 (FIG. 14 and Routine 3 below) determines whether the vehicle VN can no longer be

ROUTINE 3

```
RESTRICT SEARCH(VN)
  FOR ROAMNET=1 to MAX_ROAMNET
    IF ETA_MIN(VN, ROAMNET)<TIME_NOW
    AND LOOK_ROAMNET(VN, ROAMNET=1
    THEN
      DEASSIGN INT_COMP(ROAMNET, VN)
      LOOK_ROAMNET(VN,ROAMNET)=0
  NEXT ROAMNET
  RETURN
``` located determines whether the vehicle VN can no longer be located in a given roaming network by determining if the value for the variable ETA_MIN(VN,ROAMNET) is greater than the current time and also by checking whether the system is already searching for the vehicle in the given roaming network (identified by the variable ROAMNET). If these conditions are met, then the RESTRICT SEARCH subroutine calls the corresponding subroutine DEASSIGN_INT COMP(ROAMNET,VN) of Routine 4 below.

ROUTINE 4

```
DEASSIGN_INT_COMP(ROAMNET,VN)
DEASSIGN=INT_COMP_ID(VN, ROAMNET)
APPEND(ROAMNET,ASSIGN,"Do Not Search VN",VN) TO QUEUE_MSG_OUT
```

---
ROUTINE 4
---
LOAD(ROAMNET, DEASSIGN)=LOAD(ROAMNET, DEASSIGN)−1
INT_COMP_ID(VN, ROAMNET)=0
---

This subroutine determines which interface computer in the roaming network identified by the variable ROAMNET is currently serving vehicle VN and then instructs this interface computer to no longer search for vehicle VN by appending a Do Not Search For Vehicle VN message to the file QUEUE_MSG_OUT.

After expanding and restricting the search for vehicle VN as appropriate, the SCHEDULE SEARCH subroutine (step 232 of FIG. 14) calls the subroutine DETERMINE IF FOUND(VN) 246 (See Routine 5 below) to determine if vehicle VN has been found in at least one roaming network of the system. This routine may be modified so that a "Vehicle Not Found" message is sent to the mailboxes corresponding to the home base vehicle VN in the event that a previously found vehicle is now no longer found.

---
ROUTINE 5
---
DETERMINE IF FOUND(VN)
STATUS(VN)=0
FOR ROAMNET=1 to MAX_ROAMNET
    IF FOUND_ROAMNET=1 THEN STATUS(VN)=1
NEXT ROAMNET
RETURN STATUS(VN)
---

Following completion of the SCHEDULE SEARCH procedure, the location computer 46 transmits messages appended to the QUEUE_MSG OUT register by the subroutine, ASSIGN_INT_COMP (See Routine 6) and DEASSIGN_INT_COMP (see Routine 4), to the appropriate interface computers.

---
ROUTINE 6
---
ASSIGN_INT_COMP(ROAMNET,VN)
ASSIGN=1
MIN=LOAD(ROAMNET,1)
FOR INT_COMP_ID=2 TO INT_COMP_MAX(ROAMNET)
    IF LOAD(ROAMNET,INT_COMP_ID)<MIN
    THEN
        ASSIGN=INT_COMP_ID
        MIN=LOAD(ROAMNET,INT_COMP_ID
NEXT INT_COMP_ID
APPEND(ROAMNET, ASSIGN,"Search For VN",VN,MSN(VN)TO QUEUE_MSG_OUT
LOAD(ROAMNET, ASSIGN)=LOAD(ROAMNET, ASSIGN)+1
INT_COMP_ID(VN, ROAMNET)=ASSIGN
---

The location computer 46 may facilitate this task by first sorting all messages by roaming network and interface computer identification number, so that all messages bound for a specific interface computer may be transmitted in a single packet. After these messages are transmitted, the location computer verifies whether the operator is attempting to gain control of the system and then initiates the main procedure loop 214 (FIG. 12) by reading the next batch of inbound messages from the file QUEUE_MSG IN to the file PROCESS_MSGS.

In multiple roaming network embodiment described above, the mobile equipment required for each vehicle is the same as that described for the basic single roaming network embodiment. In order to transmit an outbound message to one or more vehicles, it is necessary for the originating equipment to first determine which roaming network currently serves the particular vehicles. This information is automatically passed to the home base by the location computer 46 and, thus, may be used for message transmission.

Further System Options and Improvements

Having described herein above embodiments detailing the vehicle location system according to this invention having one or multiple roaming networks, it is possible to implement further modifications and optional implementations to both of these systems. For example, limited dial-in and dial-out capability may be afforded to mobile vehicle telephones to prevent unauthorized use by using restricted outgoing facilities offered by some cellular carriers, such as the Pulsar series, and by limiting the ability of the home switch to forward calls so that only predefined telephone numbers may do so.

Additionally, it may be desirable to program the text terminal of each vehicle to transmit predefined messages to the home base. A typical application would be a "panic" button that could be utilized by the vehicle's driver to signal distress or other important situations. The text terminal would send these messages to the Store and Forward electronic mail system. These messages would be predefined, rather than manually entered.

The foregoing has been a detailed description of the preferred embodiments. Various modifications and alterations to these embodiments that are possible according to the spirit and scope of this invention. This detailed description should be taken only by way of example and is meant only to describe the preferred embodiments and should not be taken to limit the invention. Rather, the invention should only be limited by the following claims.

What is claimed is:

1. A vehicle location system for tracking geographical position of a cellular subscriber station free of establishing a telephone connection with the cellular subscriber station, wherein the system tracks the geographical position over a wide geographical area that includes a plurality of cellular telephone systems connected by a roaming network, wherein each of the cellular telephone systems includes a memory for holding data that (1) identifies cellular subscriber stations based in that cellular telephone system, (2) identifies visiting cellular subscriber stations based in other cellular telephone systems and (3) identifies that particular cellular telephone system, and wherein the roaming network includes means for transferring the data in the memory between the cellular telephone systems connected by the roaming network, wherein each cellular telephone system also includes means for accessing the data to, at least one of, (1) establish a telephone connection and (2) maintain a telephone connection with cellular subscriber stations based in that cellular telephone system that are visiting other cellular telephone systems connected by the roaming network, the vehicle location system comprising:

- an interface connected to the memory of at least one of the plurality of cellular telephone systems connected by the roaming network and including means for accessing the data relating to the cellular subscriber station, and means for reading the data identifying the cellular telephone system in which the cellular subscriber station is currently present; and
- means, interconnected with the interface, for translating the data relating to the cellular subscriber station into location data indicative of the geographical position of the cellular subscriber station based upon the geographical position of the cellular telephone system in which the cellular subscriber station is present.

2. The vehicle location system of claim 1 further comprising a user interface, interconnected with the means for translating, for receiving and displaying the location data.

3. The vehicle location system of claim 2 wherein the user interface further comprises means for transmitting data, to the means for translating, that identifies the cellular subscriber station to be tracked.

4. The vehicle location system of claim 3 wherein the means for translating includes means, interconnected with the interface, for instructing the interface to access data related to the cellular subscriber station.

5. The vehicle location system of claim 1 wherein the interface includes means for continuously updating location data related to cellular subscriber station, the means for updating including database means for storing data relating to an identity of a cellular telephone system in which the cellular subscriber station is positioned.

6. The vehicle location system of claim 1 wherein at least one of the plurality of cellular telephone systems includes a plurality of cellular telephone switches and the interface includes means for identifying predetermined cellular subscriber stations positioned within a cellular telephone switch.

7. The vehicle location system of any one of claims 1-6 wherein the roaming network is based upon EIA/TIA Standard IS.41.

8. The vehicle location system of any one of claims 2-4 wherein the user interface includes a store-and-forward electronic mail system.

9. The vehicle location system of claim 8 wherein the user interface includes means for transmitting messages through the store-and-forward electronic mail system to and from a predetermined cellular subscriber station.

10. The vehicle location system of claim 1 further comprising a plurality of independent roaming networks interconnecting predetermined of the plurality of cellular telephone systems, and wherein the interface includes a roaming network update means for tracking positions of predetermined cellular subscriber stations passing between the independent roaming networks.

11. The vehicle location system of claim 10 wherein the roaming network update means includes means for expanding and restricting a search for a cellular subscriber station moving between the independent roaming networks including means for predicting probable locations of a cellular subscriber stations in an adjoining roaming network based upon a movement speed and a passed movement pattern of the cellular subscriber station.

12. The vehicle location system of claim 1 wherein the cellular subscriber station comprises a mobile cellular telephone positioned in a respective vehicle.

13. A method for tracking geographical position of a cellular subscriber station free of establishing a telephone connection with the cellular subscriber station, wherein the geographical position is tracked over a wide geographical area that includes a plurality of cellular telephone systems connected by roaming network, wherein each of the cellular telephone systems includes a memory controlling data that (1) identifies cellular subscriber stations based in that telephone system, (2) identifies visiting cellular subscriber stations based in other cellular telephone systems and (3) identifies that particular cellular telephone system, and wherein the roaming network includes means for transferring the data in the memory between cellular telephone systems in the network, wherein each cellular telephone system also includes means for accessing the data to, at least one of, (1) establish a telephone connection and (2) maintain a telephone connection with cellular subscriber stations based in that cellular telephone system that are visiting other cellular telephone systems connected by the roaming network, the method comprising the steps of:

- interfacing to the memory of at least one of the plurality of cellular telephone systems connected by the roaming network, the step of interfacing including accessing the data relating to the cellular subscriber station and reading the data identifying the cellular telephone system in which the cellular subscriber station is currently present; and
- translating, in response to the step of interfacing, the data relating to the cellular subscriber station into location data indicative of the geographical position of the cellular subscriber station based upon the geographical position of the cellular telephone system in which the cellular subscriber station is currently present.

14. The method as set forth in claim 13 wherein the step of translating includes accessing data, based on received instructions, related to the cellular subscriber station.

15. The method as set forth in claim 13 wherein the cellular subscriber station transmits an identification signal to a cellular telephone system in which the cellular subscriber station is located, the identification signal being transmitted free of a cellular telephone calling procedure and wherein the step of interfacing includes accessing the data relative to the predetermined cellular subscriber stations based upon the identification signal.

16. The method as set forth in claim 15 further comprising providing a location information receiver at the cellular subscriber station and accessing data relative to a location from the receiver at predetermined times whereby a more precise geographical position than received from the step of translating can be obtained.

17. The vehicle location system of claim 1 wherein the cellular subscriber station transmits an identification signal, the signal being transmitted free of a telephone call and wherein the interface accesses the data relative to the predetermined cellular subscriber stations, the data being based upon the identification signal.

18. The vehicle location system as set forth in claim 17 further comprising a location receiver located at the cellular subscriber station and wherein the means for translating includes access means for retrieving data from the receiver whereby a geographical position that is more accurate than a geographical position based upon the position of the system in which the cellular subscriber station is obtained.

19. The vehicle location system as set forth in claim 18 wherein the cellular subscriber station includes means for automatically transmitting the identification signal at predetermined time intervals.

20. The method as set forth in claim 16 further comprising automatically transmitting the identification signal from the cellular subscriber station at predetermined time intervals.

* * * * *

UNITED STATES PATENT AND TRADEMARK OFFICE
CERTIFICATE OF CORRECTION

PATENT NO. : 5,432,841
DATED : July 11, 1995
INVENTOR(S) : Rimer

It is certified that error appears in the above-indentified patent and that said Letters Patent is hereby corrected as shown below:

On the title page: Item [76] should list the following originally-named inventors:

--Neil A. Rimer, Geneva, Switzerland;
Peter Gutierrez, London, United Kingdom;
Marco A. Fiorentino, Milano, Italy--

Item [19] should read   --Rimer et al.--

Signed and Sealed this

Twenty-fourth Day of October, 1995

*Attest:*

BRUCE LEHMAN

*Attesting Officer*        *Commissioner of Patents and Trademarks*